United States Patent
Omiya et al.

(10) Patent No.: US 7,515,182 B2
(45) Date of Patent: Apr. 7, 2009

(54) DIGITAL CAMERA WITH A HOLLOW PORTION FOR SAVING AN IMAGE TAKING LENS

(75) Inventors: Akio Omiya, Saitama (JP); Yoshihiro Ito, Asaka (JP); Takehiko Senba, Asaka (JP); Hiroshi Endo, Asaka (JP)

(73) Assignees: Fujinon Corporation, Saitama (JP); FUJIFILM Corporation, Tokyo (JP)

( * ) Notice: Subject to any disclaimer, the term of this patent is extended or adjusted under 35 U.S.C. 154(b) by 1028 days.

(21) Appl. No.: 10/688,935

(22) Filed: Oct. 21, 2003

(65) Prior Publication Data

US 2004/0179127 A1    Sep. 16, 2004

(30) Foreign Application Priority Data

Mar. 14, 2003  (JP)  ............... 2003-070416
Mar. 31, 2003  (JP)  ............... 2003-094260

(51) Int. Cl.
*H04N 5/262* (2006.01)
*H04N 5/225* (2006.01)
*G03B 17/04* (2006.01)
*G03B 5/06* (2006.01)

(52) U.S. Cl. ............... 348/240.99; 348/335; 348/373; 396/348; 396/350

(58) Field of Classification Search ............ 348/240.99, 348/345, 335, 373; 396/348–350
See application file for complete search history.

(56) References Cited

U.S. PATENT DOCUMENTS

| | | | | | |
|---|---|---|---|---|---|
| 4,451,129 | A | * | 5/1984 | Ikari et al. | ............... 396/63 |
| 4,791,441 | A | * | 12/1988 | Nishi et al. | ............... 396/75 |
| 4,887,107 | A | * | 12/1989 | Nakamura et al. | ............ 396/75 |
| 4,937,609 | A | | 6/1990 | Wakabayashi et al. | |
| 5,086,312 | A | * | 2/1992 | Tanaka et al. | ............... 396/75 |
| 5,765,049 | A | * | 6/1998 | Hase et al. | ............... 396/73 |
| 6,031,998 | A | * | 2/2000 | Shono | ............... 348/240.3 |
| 6,366,323 | B1 | * | 4/2002 | Shono | ............... 348/340 |
| 6,978,089 | B2 | * | 12/2005 | Nomura et al. | ............ 396/349 |
| 2003/0156832 | A1 | * | 8/2003 | Nomura et al. | ............... 396/72 |

FOREIGN PATENT DOCUMENTS

| | | |
|---|---|---|
| JP | 5-34769 | 2/1993 |
| JP | 8-304875 | 11/1996 |
| JP | 9-163240 | 6/1997 |
| JP | 2001-61165 | 3/2001 |
| JP | 2003-149723 A | 5/2003 |
| JP | 2003-315861 A | 11/2003 |

* cited by examiner

*Primary Examiner*—Nhan T Tran
(74) *Attorney, Agent, or Firm*—Sughrue Mion, PLLC

(57) ABSTRACT

In a digital camera, a solid state imaging device is used to catch subject light so that an image signal is created. The digital camera contributes to effectively implementing further thinness as compare with the conventional ones. A second lens group is revolved between a position on the optical axis and a saving position coming into a hollow portion beside the CCD solid state imaging device, so that the second lens group comes into the hollow portion at the time of the collapse.

33 Claims, 37 Drawing Sheets

DIGITAL CAMERA WITH A HOLLOW PORTION FOR SAVING AN IMAGE TAKING LENS

BACKGROUND OF THE INVENTION

1. Field of the Invention

The present invention relates to a digital camera in which a solid state imaging device is used to catch subject light so that an image signal is created.

2. Description of the Related Art

Hitherto, such a type of camera that photography is performed on a silver halide film comes into wide use. And recently, in addition to such a type of camera, there rapidly comes into wide use a digital camera in which a subject is image-formed on a solid state imaging device such as a CCD imaging device or an LMOS imaging device to create an image signal.

Also in such a digital camera, there is strongly needed a portability as well as a photographic efficiency, and there is performed such a matter that a image taking lens is collapsed and stored in a thin type of body so that photography of a desired angle of view is possible while a focal length is variable, and the camera is convenient to carry about.

There is widely adopted such a type of image taking lens, which is variable in a focal length, comprising three groups of a first lens group, a rear elements lens, and a focus lens in the named order with respect to the optical axis direction, wherein the focusing is performed by a movement of the focus lens. Usually, a member for light quantity control, such as a shutter or an aperture, is provided between the front lens and the rear lens or the rear lens and the focus lens.

Hitherto, it is attempted to provide thinness of the lens structure by collapsing an image taking lens so as to narrow intervals between the lenses and intervals between the lens and the shutter as far as possible. However, there is a limit to this in connection with providing thinness.

In order to provide further thinness of the lens structure, it is considered that image taking lenses are collapsed in such a manner any group of the image taking lenses is saved so as to be out of an optical axis. However, there are not proposed matters as to what group is saved to where makes it possible to provide further thinness of the lens structure, or what saving mechanism is provided makes it possible to save the image taking lenses to a predetermined position at the time of the collapse and to properly advance the image taking lenses to an optical axis at the time of the extension, with a simple structure.

Hitherto, it is known that in order to alter the focal length, the rear lens is disposed on an optical axis to form a telephoto lens, and the rear lens is out of the optical axis to form a wide-angle lens (cf. Japanese Patent Application Laid Open Gazette TokuKai Hei. 5-34769). However, this proposal is one for simply altering the focal length, and does not contribute to providing thinness of a camera.

As technology related to the present invention, which will be described later, there is known a shutter using an electrooptical element, such as a liquid crystal shutter using liquid crystal (cf. Japanese Patent Application Laid Open Gazette TokuKai Hei. 9-163240, and Japanese Patent Application Laid Open Gazette TokuKai 2001-61165), and a PLZ shutter using a deflection plate (cf. Japanese Patent Application Laid Open Gazette TokuKai Hei. 8-304875).

SUMMARY OF THE INVENTION

In view of the foregoing, it is an object of the present invention to provide a digital camera contributing to effectively implementing further thinness as compare with the conventional ones.

To achieve the above-mentioned objects, the present invention provides a first digital camera that creates an image signal through catching a subject light, the digital camera comprising:

an image taking lens, which is variable in a focal length, comprising three groups of a first lens group, a second lens group, and a third lens group in the named order with respect to an optical axis direction;

a lens barrel that incorporates therein the image taking lens, having in front an aperture through which the image taking lens appears and having in rear an internal space defined by a wall, the lens barrel being free in extension and collapse and performing a focal length control; and a solid state imaging device that receives the subject light formed by the image taking lens to create the image signal, the solid state imaging device being disposed at a position projecting from the wall to the internal space and being supported by the wall, wherein the lens barrel has a lens advancing and saving mechanism in which at the time of the collapse of the lens barrel, the second lens group is saved to a hollow portion divided by the solid state imaging device and the wall beside the solid state imaging device, the hollow portion being formed by the fact that the solid state imaging device is disposed at the position projecting from the wall, and at the time of the extension of the lens barrel, the second lens group is advanced onto an optical axis of the image taking lens.

In case of a digital camera having a solid state imaging device such as a CCD imaging device, the hollow portion by the side of the solid state imaging device is apt to be a dead space. The first digital camera of the present invention is to effectively utilize the hollow portion. According to the first digital camera of the present invention, the second lens group is saved to the hollow portion and thereby contributing to implementing further thinness of the camera.

In the first digital camera according to the present invention as mentioned above, it is acceptable that the lens barrel comprises a focusing mechanism wherein a focusing is performed by a movement of the third lens group in the optical axis direction.

In the first digital camera according to the present invention as mentioned above, it is preferable that the lens barrel has a second lens group guide frame that moves in the optical axis direction in accordance with the extension and the collapse so as to determine a position related to the optical axis direction of the second lens group, and a second lens group holding frame that holds the second lens group and is pivotally supported by the second lens group guide frame, the second lens group holding frame causing the second lens group to revolve on the optical axis of the image taking lens at the time of the extension, and the second lens group holding frame causing the second lens group to revolve on the hollow portion at the time of the collapse.

In case of the conventional camera wherein the second lens group is simply moved in the optical axis direction, there is provided a lens frame for determining a position of the second lens group in the optical axis direction to move the lens frame in the optical axis direction. On the other hand, according to the first digital camera of the present invention, the lens frame is divided into the second lens group guide frame and the second lens group holding frame, and the second lens group holding frame is pivotally supported by the second lens group guide frame on a rotatably movable basis, and whereby the second lens group held by the second lens group holding frame may revolve. Thus, according to the first digital camera of the present invention, it is possible with the simple mechanism to save the second lens group to the hollow portion at the time of the collapse, and to accurately advance the second lens group onto the optical axis at the time of the extension.

In the first digital camera according to the present invention as mentioned above, it is acceptable that the second lens group holding frame is enabled in a direction that the second lens group is revolved on the optical axis, the wall has a revolving affecting section having a geometry projecting into the internal space, the revolving affecting section being in contact with the second lens group holding frame at the time of the collapse to affect revolving of the rear elements holding frame, and the second lens group holding frame has an affect receiving section that is pushed by the revolving affecting section at the time of the collapse so that the second lens group revolves into the hollow portion.

In the first digital camera according to the present invention as mentioned above, it is preferable that the second lens group holding frame causes the second lens group to advance onto the optical axis of the image taking lens by affect of the enabling, at the time of the extension, in such a manner that the affect receiving section is separated from the revolving affecting section.

In the first digital camera according to the present invention as mentioned above, it is acceptable that the revolving affecting section has a taper on the top, and the affect receiving section causes the second lens group to be saved from the optical axis of the image taking lens to the hollow portion through revolving by means of pushing by the taper of the revolving affecting section, at the time of the collapse.

In the first digital camera according to the present invention as mentioned above, it is acceptable that the second lens group holding frame is enabled in a direction that the second lens group is revolved on the optical axis, the lens barrel has a cylinder that rotatably moves in accordance with the extension, the collapse and the focal length control, and the cylinder has a revolving affecting section being in contact with the second lens group holding frame by a rotatable movement of the cylinder at the time of the collapse to affect revolving of the second lens group holding frame, and the second lens group holding frame has an affect receiving section that is pushed by the revolving affecting section at the time of the collapse so that the second lens group revolves into the hollow portion.

In the first digital camera according to the present invention as mentioned above, it is preferable that the second lens group holding frame causes the second lens group to advance onto the optical axis of the image taking lens, at the time of the extension, in such a manner that the second lens group holding frame is released from urging of the revolving affecting section.

In the first digital camera according to the present invention as mentioned above, it is acceptable that the revolving affecting section has a projection provided at the rear end of the cylinder with respect to the optical axis direction, and the affect receiving section causes the second lens group to be saved from the optical axis of the image taking lens to the hollow portion through revolving by means of pushing by the taper of the revolving affecting section, at the time of the collapse.

In the first digital camera according to the present invention as mentioned above, it is acceptable that the digital camera further comprises a driving source that rotatably moves the second lens group holding frame so that the second lens group revolves.

In the first digital camera according to the present invention as mentioned above, it is acceptable that the driving source is a motor, and the second lens group holding frame has a gear for transmitting a driving force from the motor.

To achieve the above-mentioned objects, the present invention provides a second digital camera that creates an image signal through catching a subject light, the digital camera comprising:

an image taking lens, which is variable in a focal length, comprising three groups of a first lens group, a second lens group, and a third lens group in the named order with respect to an optical axis direction;

a lens barrel that incorporates therein the image taking lens, having in front an aperture through which the image taking lens appears and having in rear an internal space defined by a wall, the lens barrel being free in extension and collapse and performing a focal length control; and a solid state imaging device that receives the subject light formed by the image taking lens to create the image signal, the solid state imaging device being supported by the wall, wherein the lens barrel has a second lens group guide frame that moves in the optical axis direction in accordance with the extension and the collapse so as to determine a position related to the optical axis direction of the second lens group, and a second lens group holding frame that holds the second lens group and is pivotally supported by the second lens group guide frame, the second lens group holding frame causing the second lens group to revolve on the optical axis of the image taking lens at the time of the extension, and the second lens group holding frame causing the second lens group to revolve on a saving position out of the optical axis of the image taking lens at the time of the collapse.

In case of the conventional camera, there is determined simply a position of the second lens group in the optical axis direction. On the other hand, according to the second digital camera of the present invention, the lens frame is divided into the second lens group guide frame and the second lens group holding frame, and the second lens group holding frame is pivotally supported by the second lens group guide frame on a rotatably movable basis, and whereby the second lens group held by the second lens group holding frame may revolve. Thus, according to the second digital camera of the present invention, it is possible with the simple mechanism to save the second lens group to the saving position out of the optical axis of the image taking lens at the time of the collapse, and to accurately advance the second lens group onto the optical axis at the time of the extension.

In the second digital camera according to the present invention, it is acceptable that the lens barrel has a focusing mechanism wherein a focusing is performed by a movement of the third lens group in the optical axis direction.

In the second digital camera according to the present invention, it is acceptable that the second lens group holding frame is enabled in a direction that the second lens group is revolved on the optical axis, the wall has a revolving affecting section having a geometry projecting into the internal space, the revolving affecting section being in contact with the second lens group holding frame at the time of the collapse to affect revolving of the second lens group holding frame, and the second lens group holding frame has an affect receiving section that is pushed by the revolving affecting section at the time of the collapse so that the second lens group revolves into the saving position.

In the second digital camera according to the present invention, it is acceptable that the second lens group holding frame causes the second lens group to advance onto the optical axis of the image taking lens by affect of the enabling, at the time of the extension, in such a manner that the affect receiving section is separated from the revolving affecting section.

In the second digital camera according to the present invention, it is acceptable that the revolving affecting section has a taper on the top, and the affect receiving section causes the second lens group to be saved from the optical axis of the image taking lens to the saving position through revolving by means of pushing by the taper of the revolving affecting section, at the time of the collapse.

In the second digital camera according to the present invention, it is acceptable that the second lens group holding frame is enabled in a direction that the second lens group is revolved on the optical axis, the lens barrel has a cylinder that rotatably moves in accordance with the extension and the collapse, and the cylinder has a revolving affecting section being in contact with the second lens group holding frame by a rotatable movement of the cylinder at the time of the collapse to affect revolving of the second lens group holding frame, and the second lens group holding frame has an affect receiving section that is pushed by the revolving affecting section at the time of the collapse so that the second lens group revolves into the saving position.

In the second digital camera according to the present invention, it is preferable that the second lens group holding frame causes the second lens group to advance onto the optical axis of the image taking lens, at the time of the extension, in such a manner that the second lens group holding frame is released from urging of the revolving affecting section.

In the second digital camera according to the present invention, it is acceptable that the revolving affecting section has a projection provided at the rear end of the cylinder with respect to the optical axis direction, and the affect receiving section causes the second lens group to be saved from the optical axis of the image taking lens to the saving position through revolving by means of pushing by the taper of the revolving affecting section, at the time of the collapse.

In the second digital camera according to the present invention, it is acceptable that the digital camera further comprises a driving source that rotatably moves the second lens group holding frame so that the second lens group revolves.

In the second digital camera according to the present invention, it is acceptable that the driving source is a motor, and the second lens group holding frame has a gear for transmitting a driving force from the motor.

In the first and second digital cameras according to the present invention as mentioned above, it is preferable that the digital camera further comprises a light quantity control member that moves in one united body together with the second lens group in the optical axis direction of the image taking lens stored in the lens barrel to control a light quantity of the subject light passing through the image taking lens, and the lens advancing and saving mechanism provides such a performance that at the time of the collapse of the lens barrel, the light quantity control member is saved together with the second lens group to the hollow portion, and at the time of the extension of the lens barrel, the light quantity control member is advanced together with the second lens group onto the optical axis of the image taking lens.

Here, it is preferable that the light quantity control member consists of an electrooptical element.

Here, it is preferable that the light quantity control member is an aperture member that controls an aperture caliber to control the subject light passing through the image taking lens.

Here, it is preferable that the light quantity control member is a shutter member that controls a shutter speed to control the subject light passing through the image taking lens.

Saving of the light quantity control member to the hollow portion together with the second lens group at the time of the collapse makes it possible to implement further thinness of the digital camera at the time of the collapse in accordance with the specific structure of the lens barrel including the image taking lens and the light quantity control member.

To achieve the above-mentioned objects, the present invention provides a third digital camera that creates an image signal through catching a subject light, the digital camera comprising:

an image taking lens, which is variable in a focal length, comprising three groups of a front elements lens, a rear elements lens, and a focus lens in the named order with respect to an optical axis direction, wherein a focusing is performed by a movement of the focus lens;

a lens barrel that incorporates therein the image taking lens, having in front an aperture through which the image taking lens appears and having in rear an internal space defined by a wall, the lens barrel being free in extension and collapse and performing a focal length control; and a solid state imaging device that receives the subject light formed by the image taking lens to create the image signal, the solid state imaging device being disposed at a position projecting from the wall to the internal space and being supported by the wall, wherein the lens barrel has a lens advancing and saving mechanism in which at the time of the collapse of the lens barrel, the rear elements lens is saved to a hollow portion divided by the solid state imaging device and the wall beside the solid state imaging device, the hollow portion being formed by the fact that the solid state imaging device is disposed at the position projecting from the wall, and at the time of the extension of the lens barrel, the rear elements lens is advanced onto an optical axis of the image taking lens.

In case of a digital camera having a solid state imaging device such as a CCD imaging device, the hollow portion by the side of the solid state imaging device is apt to be a dead space. The third digital camera of the present invention is to effectively utilize the hollow portion. According to the third digital camera of the present invention, the rear elements lens is saved to the hollow portion and thereby contributing to implementing further thinness of the camera.

In the third digital camera according to the present invention as mentioned above, it is preferable that the lens barrel has a rear elements guide frame that moves in the optical axis direction in accordance with the extension, the collapse and the focal length control so as to determine a position related to the optical axis direction of the rear elements lens, and a rear elements holding frame that holds the rear elements lens and is pivotally supported by the rear elements guide frame, the rear elements holding frame causing the rear elements lens to revolve on the optical axis of the image taking lens at the time of the extension, and the rear elements holding frame causing the rear elements lens to revolve on the hollow portion at the time of the collapse.

In case of the conventional camera wherein the rear elements lens is simply moved in the optical axis direction, there is provided a lens frame for determining a position of the rear elements lens in the optical axis direction to move the lens frame in the optical axis direction. On the other hand, according to the third digital camera of the present invention, the lens frame is divided into the rear elements guide frame and the rear elements holding frame, and the rear elements holding frame is pivotally supported by the rear elements guide frame on a rotatably movable basis, and whereby the rear elements lens held by the rear elements holding frame may revolve. Thus, according to the third digital camera of the present invention, it is possible with the simple mechanism to save the rear elements lens to the hollow portion at the time of the collapse, and to accurately advance the rear elements lens onto the optical axis at the time of the extension.

In the third digital camera according to the present invention as mentioned above, it is acceptable that the rear elements holding frame is enabled in a direction that the rear elements lens is revolved on the optical axis, the wall has a revolving affecting section having a geometry projecting into the internal space, the revolving affecting section being in contact with the rear elements holding frame at the time of the collapse to affect revolving of the rear elements holding frame, and the rear elements holding frame has an affect receiving section that is pushed by the revolving affecting section at the time of the collapse so that the rear elements lens revolves into the hollow portion.

In the third digital camera according to the present invention as mentioned above, it is acceptable that the rear elements holding frame is enabled in a direction that the rear elements lens is revolved on the optical axis, the lens barrel has a cylinder that rotatably moves in accordance with the extension, the collapse and the focal length control, and the cylinder has a revolving affecting section being in contact with the rear elements holding frame by a rotatable movement of the cylinder at the time of the collapse to affect revolving of the rear elements holding frame, and the rear elements holding frame has an affect receiving section that is pushed by the revolving affecting section at the time of the collapse so that the rear elements lens revolves into the hollow portion.

In the third digital camera according to the present invention as mentioned above, it is acceptable that the digital camera further comprises a driving source that rotatably moves the rear elements holding frame so that the rear elements lens revolves.

To achieve the above-mentioned objects, the present invention provides a fourth digital camera that creates an image signal through catching a subject light, the digital camera comprising:

an image taking lens, which is variable in a focal length, comprising three groups of a front elements lens, a rear elements lens, and a focus lens in the named order with respect to an optical axis direction, wherein a focusing is performed by a movement of the focus lens;

a lens barrel that incorporates therein the image taking lens, having in front an aperture through which the image taking lens appears and having in rear an internal space defined by a wall, the lens barrel being free in extension and collapse and performing a focal length control; and a solid state imaging device that receives the subject light formed by the image taking lens to create the image signal, the solid state imaging device being supported by the wall, wherein the lens barrel has a rear elements guide frame that moves in the optical axis direction in accordance with the extension, the collapse and the focal length control so as to determine a position related to the optical axis direction of the rear elements lens, and a rear elements holding frame that holds the rear elements lens and is pivotally supported by the rear elements guide frame, the rear elements holding frame causing the rear elements lens to revolve on the optical axis of the image taking lens at the time of the extension, and the rear elements holding frame causing the rear elements lens to revolve on a saving position out of the optical axis of the image taking lens at the time of the collapse.

In case of the conventional camera, there is determined simply a position of the rear elements lens in the optical axis direction. On the other hand, according to the fourth digital camera of the present invention, the lens frame is divided into the rear elements guide frame and the rear elements holding frame, and the rear elements holding frame is pivotally supported by the rear elements guide frame on a rotatably movable basis, and whereby the rear elements lens held by the rear elements holding frame may revolve. Thus, according to the fourth digital camera of the present invention, it is possible with the simple mechanism to save the rear elements lens to the saving position out of the optical axis of the image taking lens at the time of the collapse, and to accurately advance the rear elements lens onto the optical axis at the time of the extension.

In the fourth digital camera according to the present invention, it is acceptable that the rear elements holding frame is enabled in a direction that the rear elements lens is revolved on the optical axis, the wall has a revolving affecting section having a geometry projecting into the internal space, the revolving affecting section being in contact with the rear elements holding frame at the time of the collapse to affect revolving of the rear elements holding frame, and the rear elements holding frame has an affect receiving section that is pushed by the revolving affecting section at the time of the collapse so that the rear elements lens revolves into the saving position.

In the fourth digital camera according to the present invention as mentioned above, it is acceptable that the rear elements holding frame is enabled in a direction that the rear elements lens is revolved on the optical axis, the lens barrel has a cylinder that rotatably moves in accordance with the extension, the collapse and the focal length control, and the cylinder has a revolving affecting section being in contact with the rear elements holding frame by a rotatable movement of the cylinder at the time of the collapse to affect revolving of the rear elements holding frame, and the rear elements holding frame has an affect receiving section that is pushed by the revolving affecting section at the time of the collapse so that the rear elements lens revolves into the hollow portion.

In the fourth digital camera according to the present invention as mentioned above, it is acceptable that the digital camera further comprises a driving source that rotatably moves the rear elements holding frame so that the rear elements lens revolves.

In the third and fourth digital cameras according to the present invention as mentioned above, it is preferable that the digital camera further comprises a light quantity control member that moves in one united body together with the rear elements lens in the optical axis direction of the image taking lens stored in the lens barrel to control a light quantity of the subject light passing through the image taking lens, and the lens advancing and saving mechanism provides such a performance that at the time of the collapse of the lens barrel, the light quantity control member is saved together with the rear elements lens to the hollow portion, and at the time of the extension of the lens barrel, the light quantity control member is advanced together with the rear elements lens onto the optical axis of the image taking lens.

DETAILED DESCRIPTION OF PREFERRED EMBODIMENTS

Embodiments of the present invention will be described with reference to the accompanying drawings.

Figure 1:
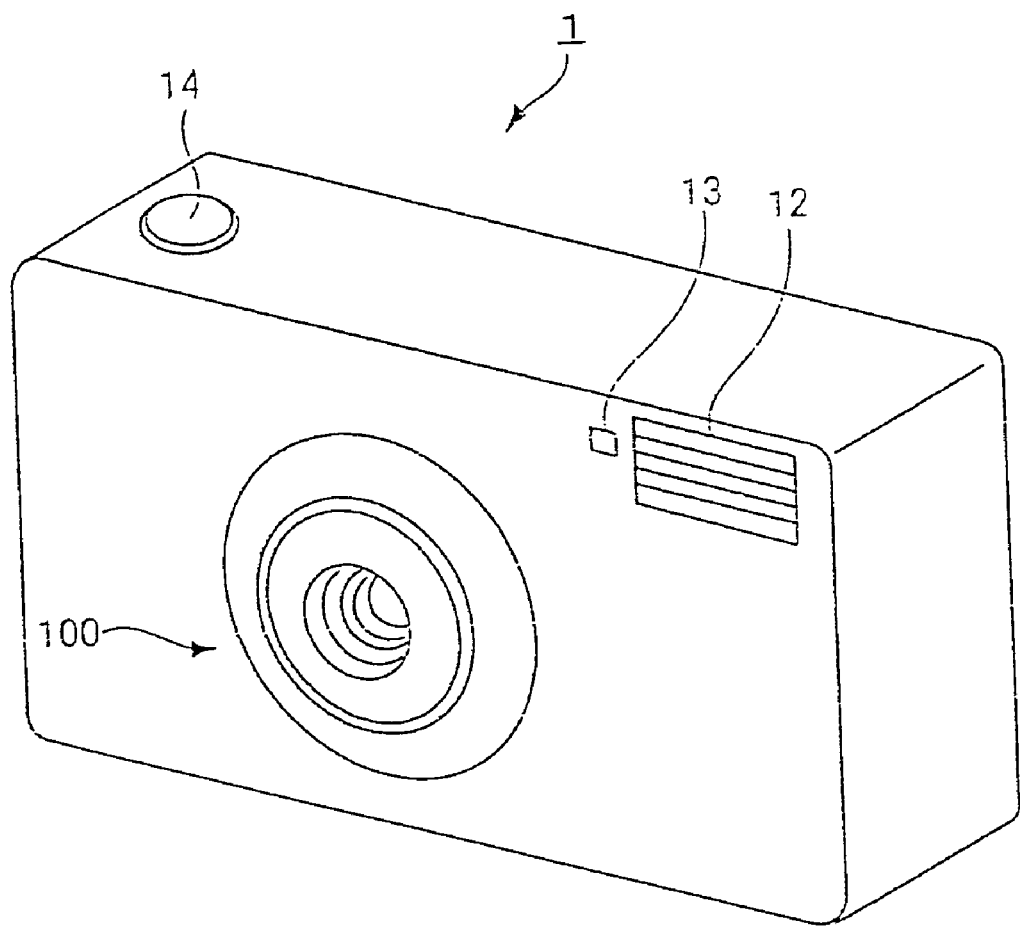
FIG. 1 is a perspective view of a digital camera of a first embodiment of the present invention.
Figure 2:
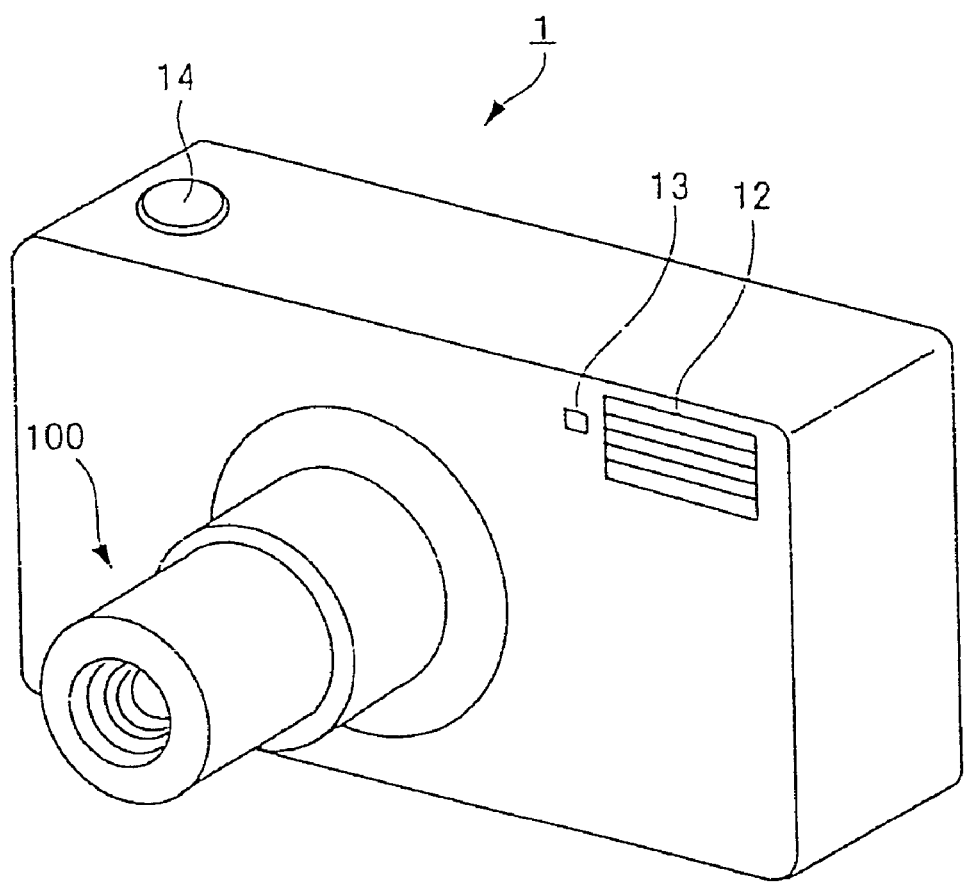
FIG. 2 is a perspective view of the digital camera of the first embodiment of the present invention.

Each of FIG. 1 and FIG. 2 is a perspective view of the digital camera of the first embodiment of the present invention.

FIG. 1 shows a collapsed state of a lens barrel 100 incorporating therein a zoom lens of a digital camera 1 of the present embodiment. FIG. 2 shows an extended state of the lens barrel 100 of the digital camera 1.

The lens barrel 100 of the camera 1 shown in FIG. 1 and FIG. 2 incorporates therein an image taking lens consisting of three lens groups as will be explained later. A movement of those three lens groups in an optical axis direction makes it possible to perform an adjustment of a focal length. And movements of the third group of focus lens in the optical axis direction make it possible to perform an adjustment of a focusing.

In upper front of the digital camera 1 shown in FIG. 1 and FIG. 2, there are disposed a flash window 12 and a finder objective window 13. On the top of the digital camera 1, there is disposed a shutter button 14.

On the back (not illustrated) of the digital camera 1, there is disposed a zoom operation switch. When one end of the zoom operation switch is depressed, the lens barrel 100 is extended to a telephoto side while the zoom operation switch is depressed. And when another end of the zoom operation switch is depressed, the lens barrel 100 is moved to a wide-angle side while the zoom operation switch is depressed.

Figure 3:
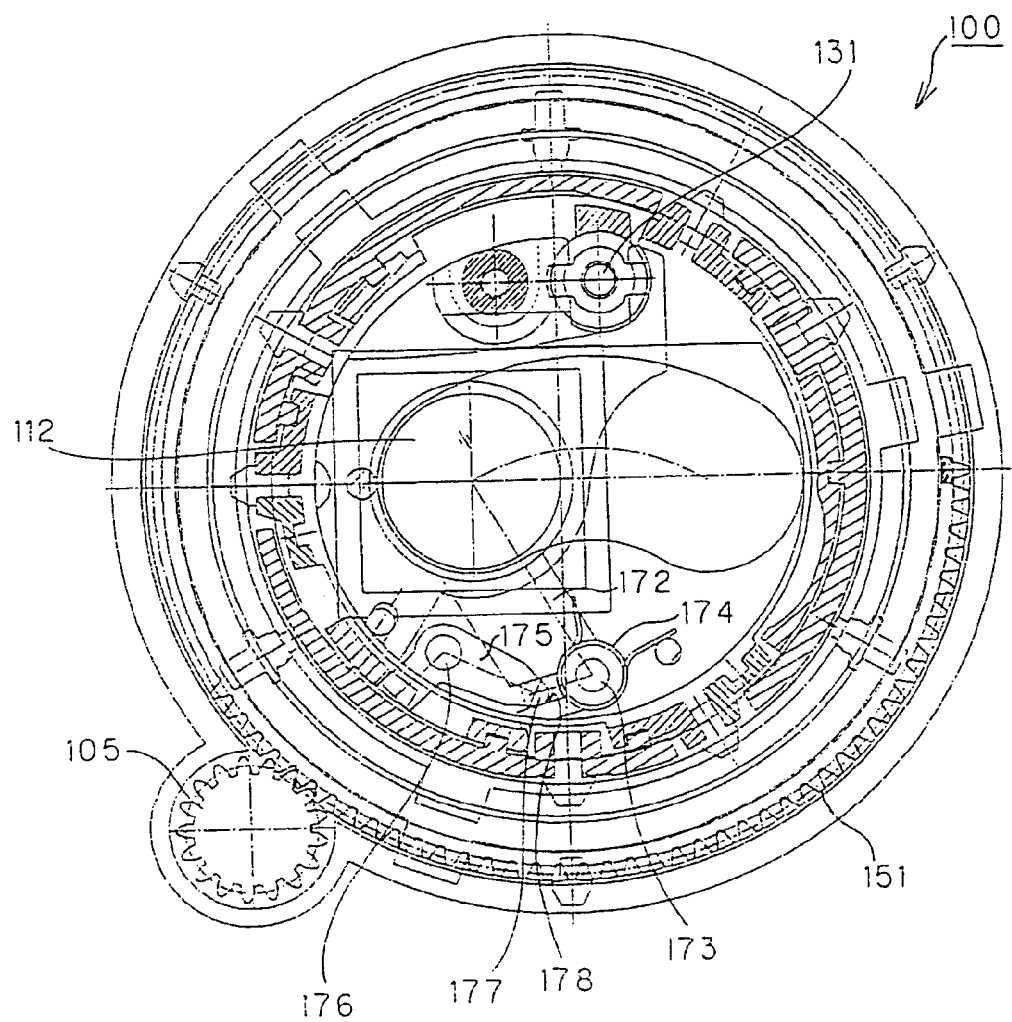
FIG. 3 is a typical illustration showing main parts of the digital camera of the first embodiment of the present invention, looking from an optical axis direction a lens barrel in a state of an extension.
Figure 4:
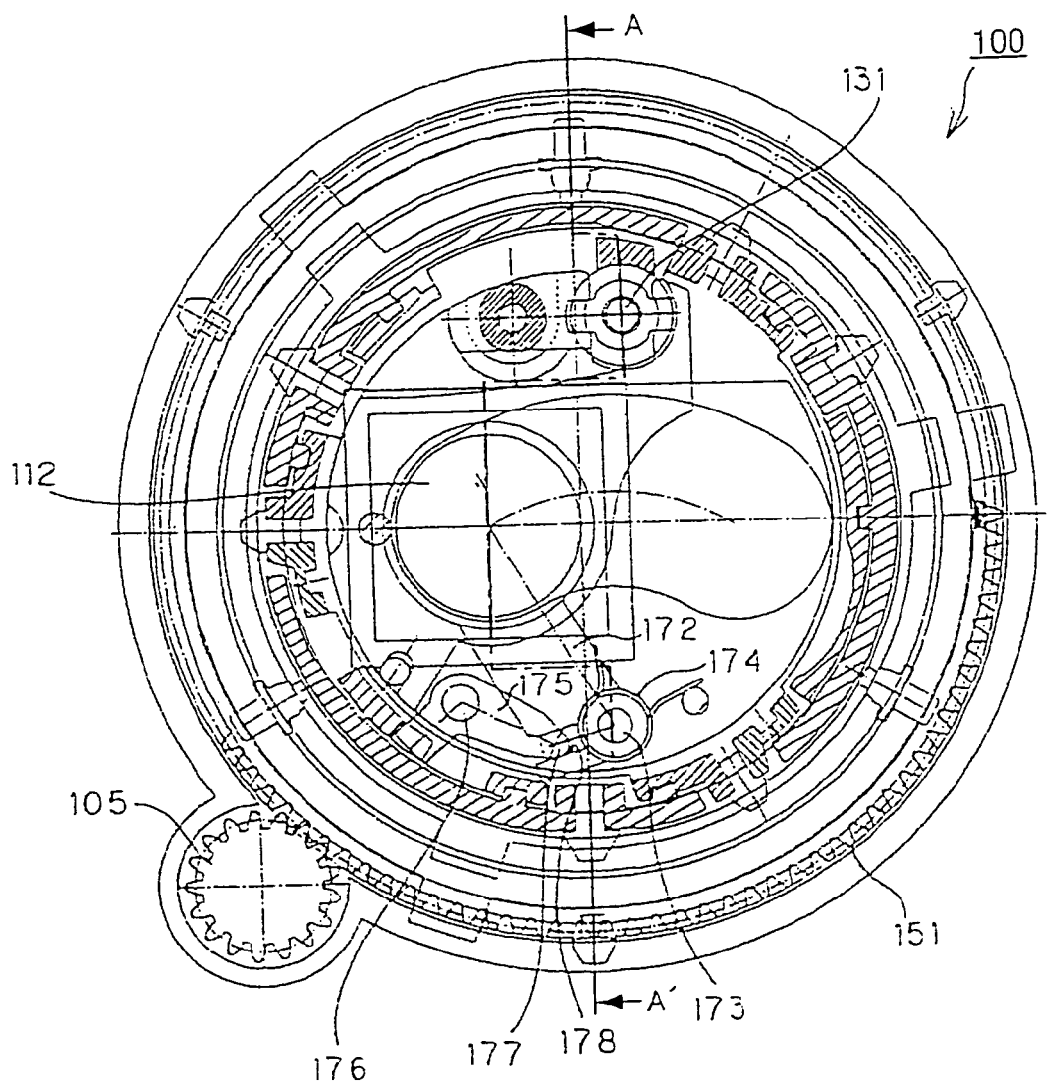
FIG. 4 is a view showing the line A-A' on the same sectional view as FIG. 3.
Figure 5:
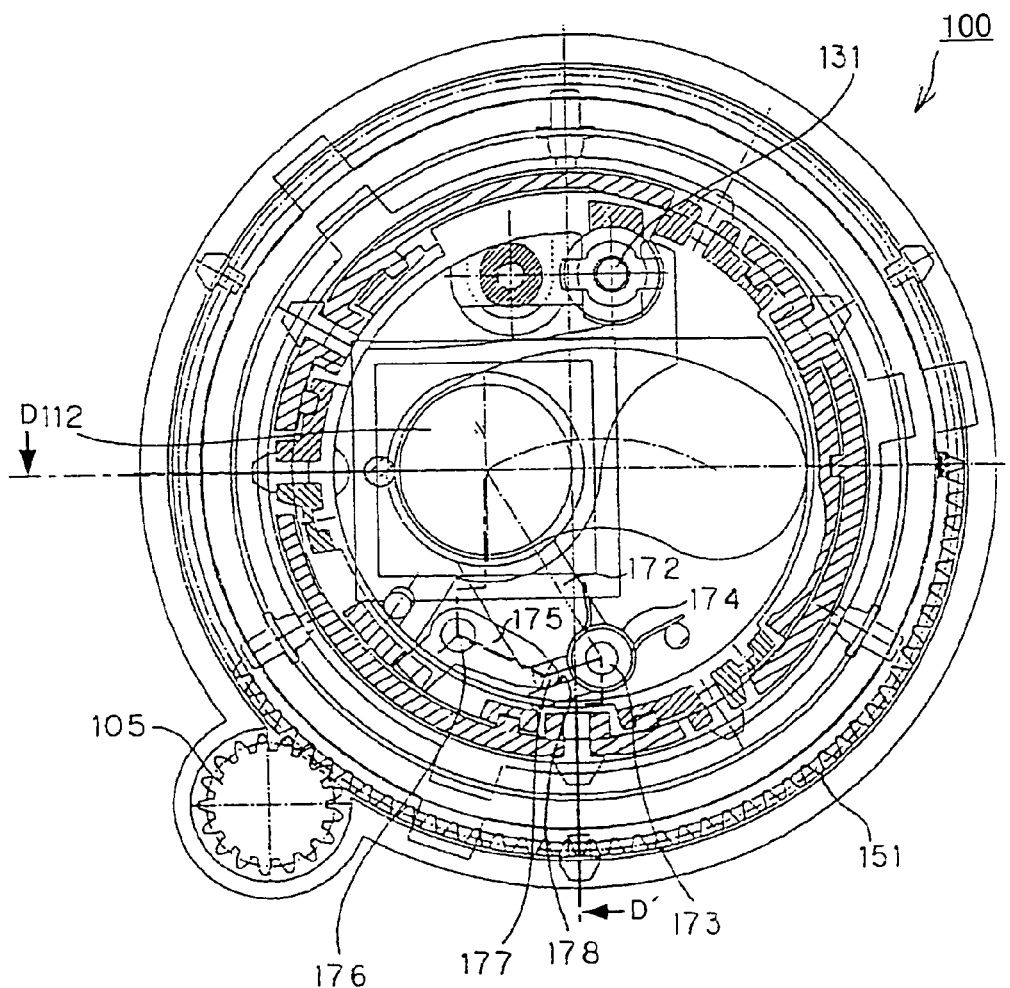
FIG. 5 is a view showing the line D-D' on the same sectional view as FIG. 3.
Figure 6:
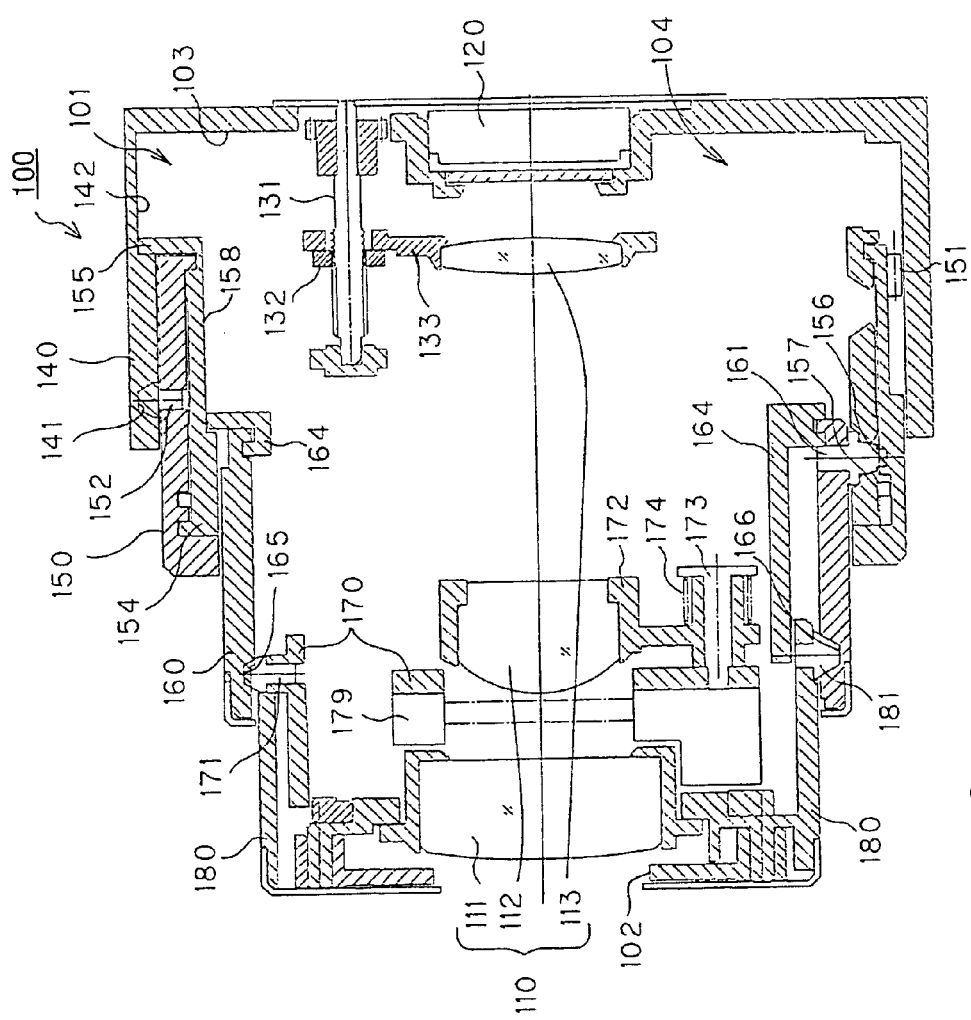
FIG. 6 is a sectional view showing a state of a tele-edge where the focal length is longest, taken along the line A-A' in FIG. 4.
Figure 7:
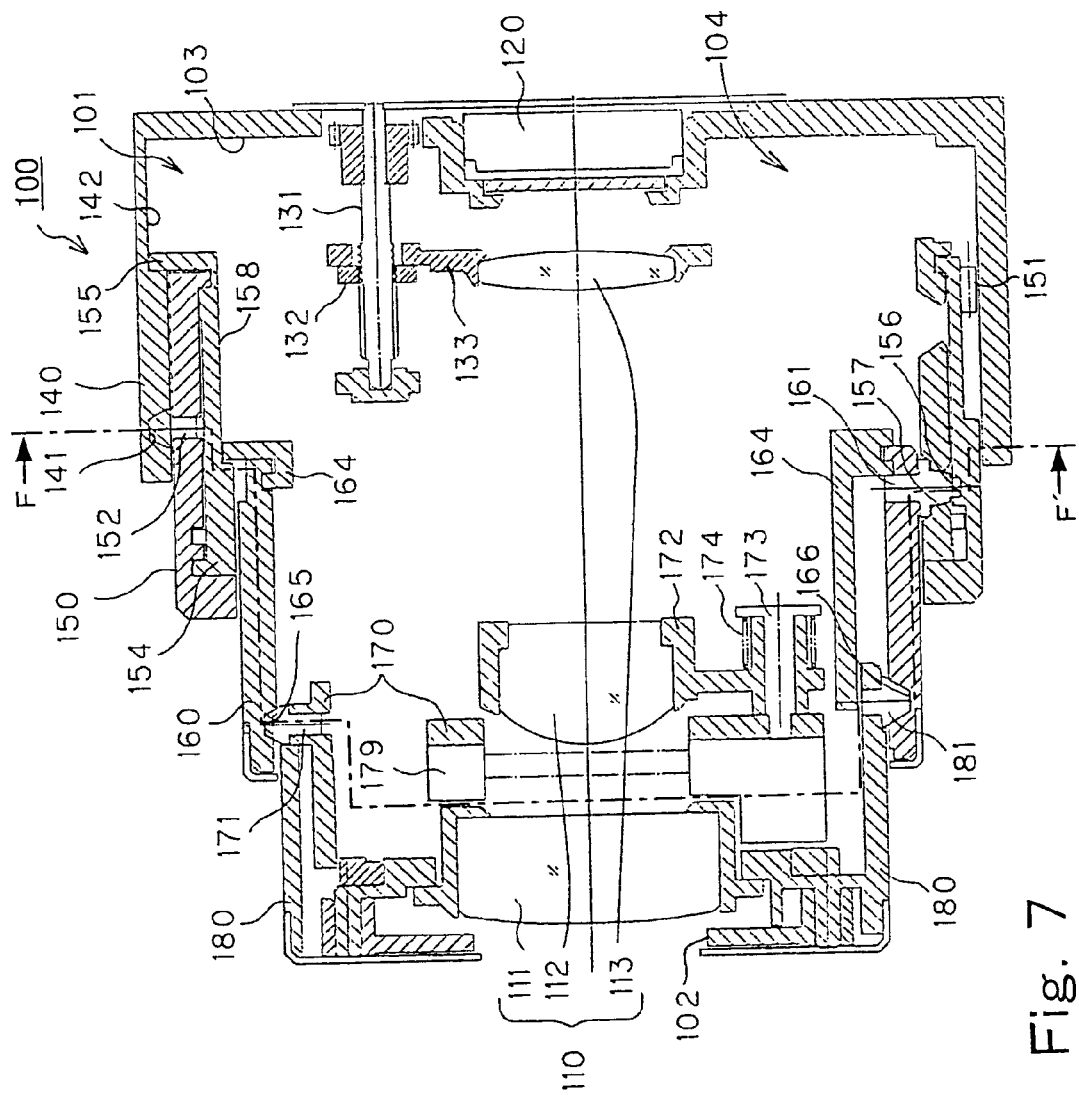
FIG. 7 is a view showing the line F-F' on the same sectional view as FIG. 6.
Figure 8:
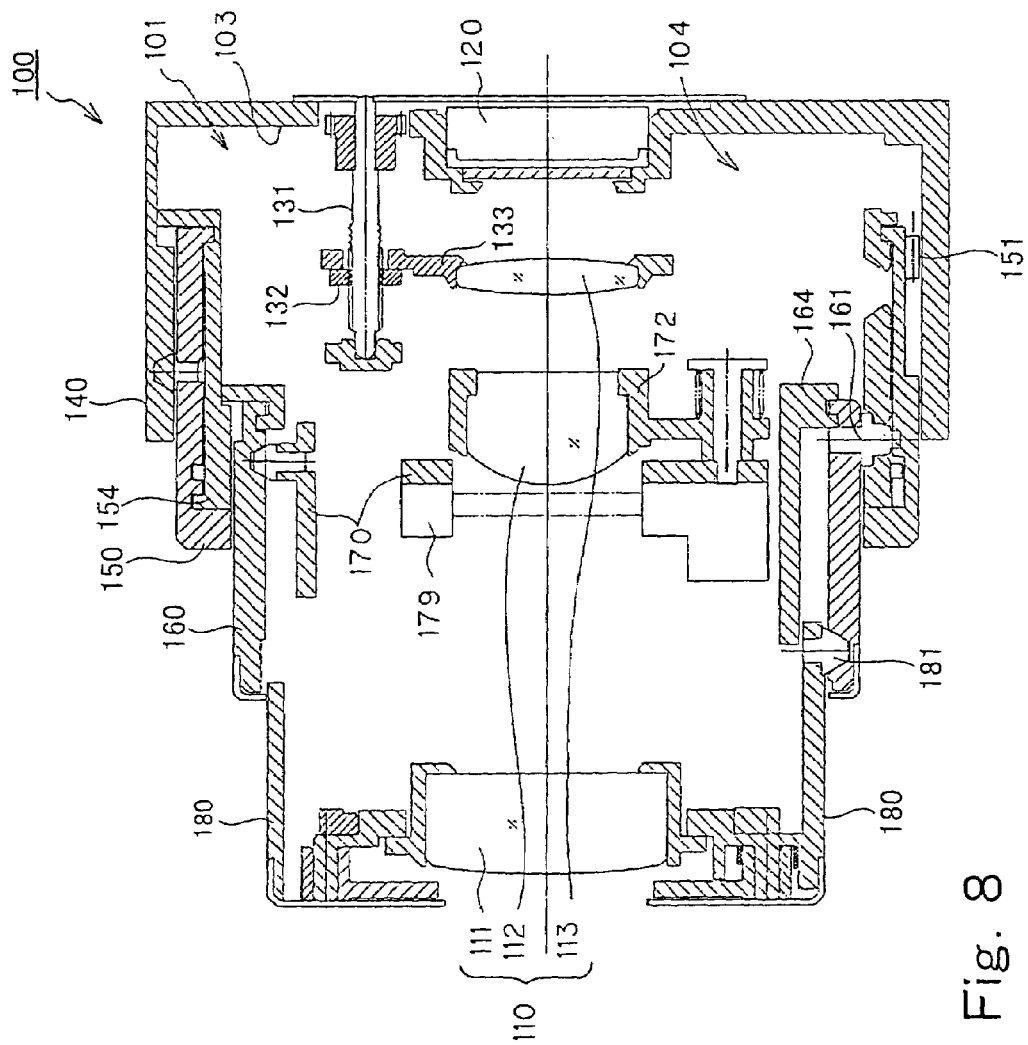
FIG. 8 is a sectional view showing a state of a wide-edge where the focal length is shortest, taken along the line A-A' in FIG. 4.
Figure 9:
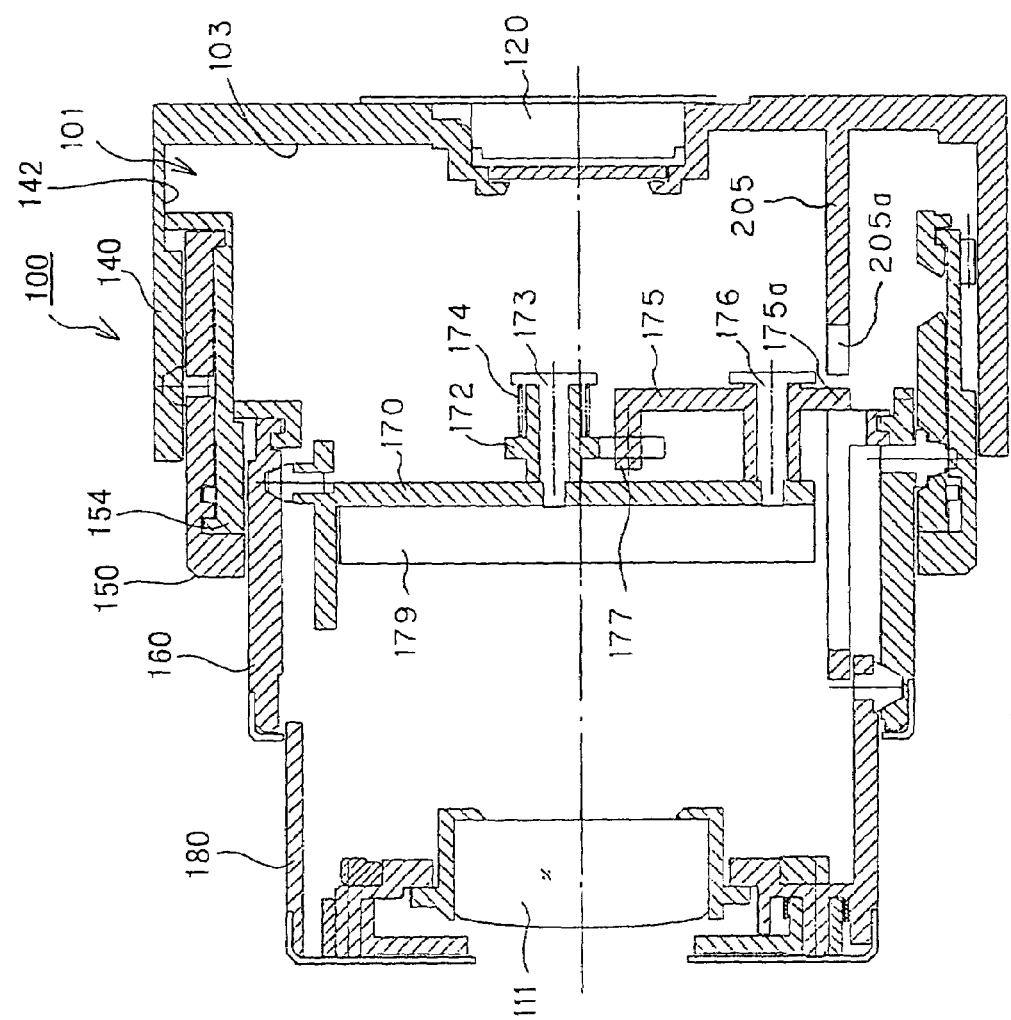
FIG. 9 is a sectional view showing main parts in a state of the wide-edge, taken along the line D-D' in FIG. 5.
Figure 10:
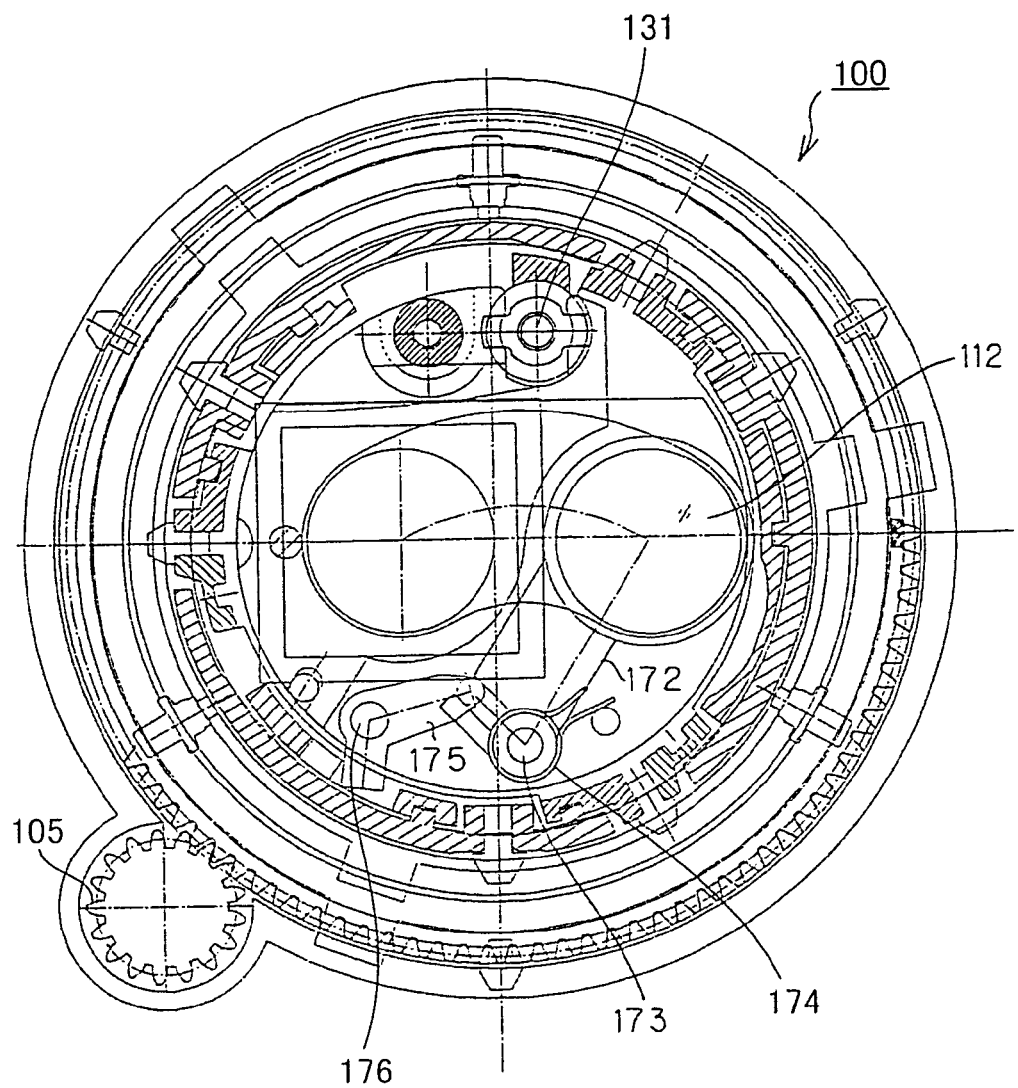
FIG. 10 is a typical illustration showing main parts of the digital camera of the first embodiment of the present invention, looking from an optical axis direction a lens barrel in a state of a collapse.
Figure 11:
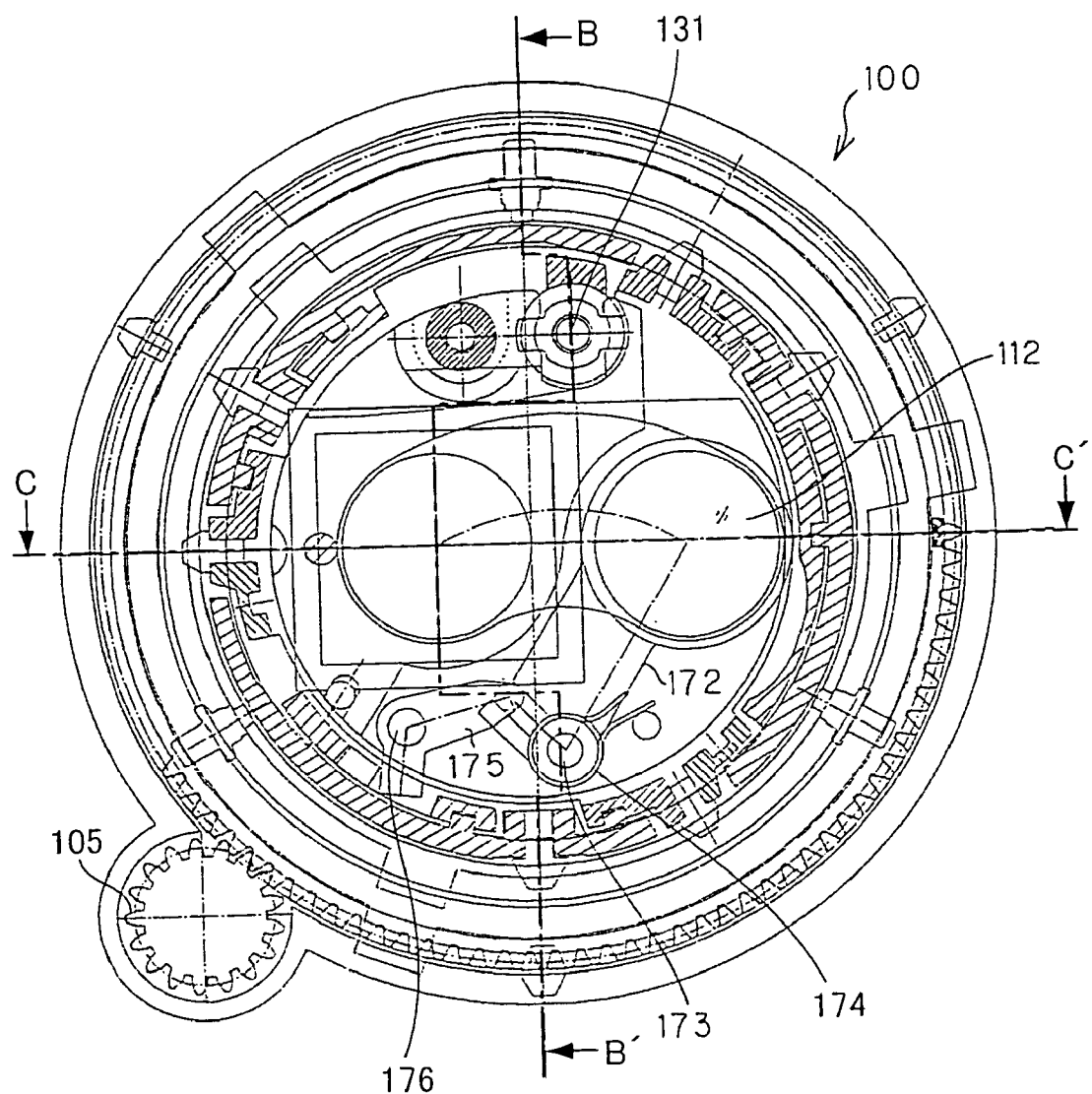
FIG. 11 is a view showing the line B-B' and the line C-C' on the same sectional view as FIG. 10.
Figure 12:
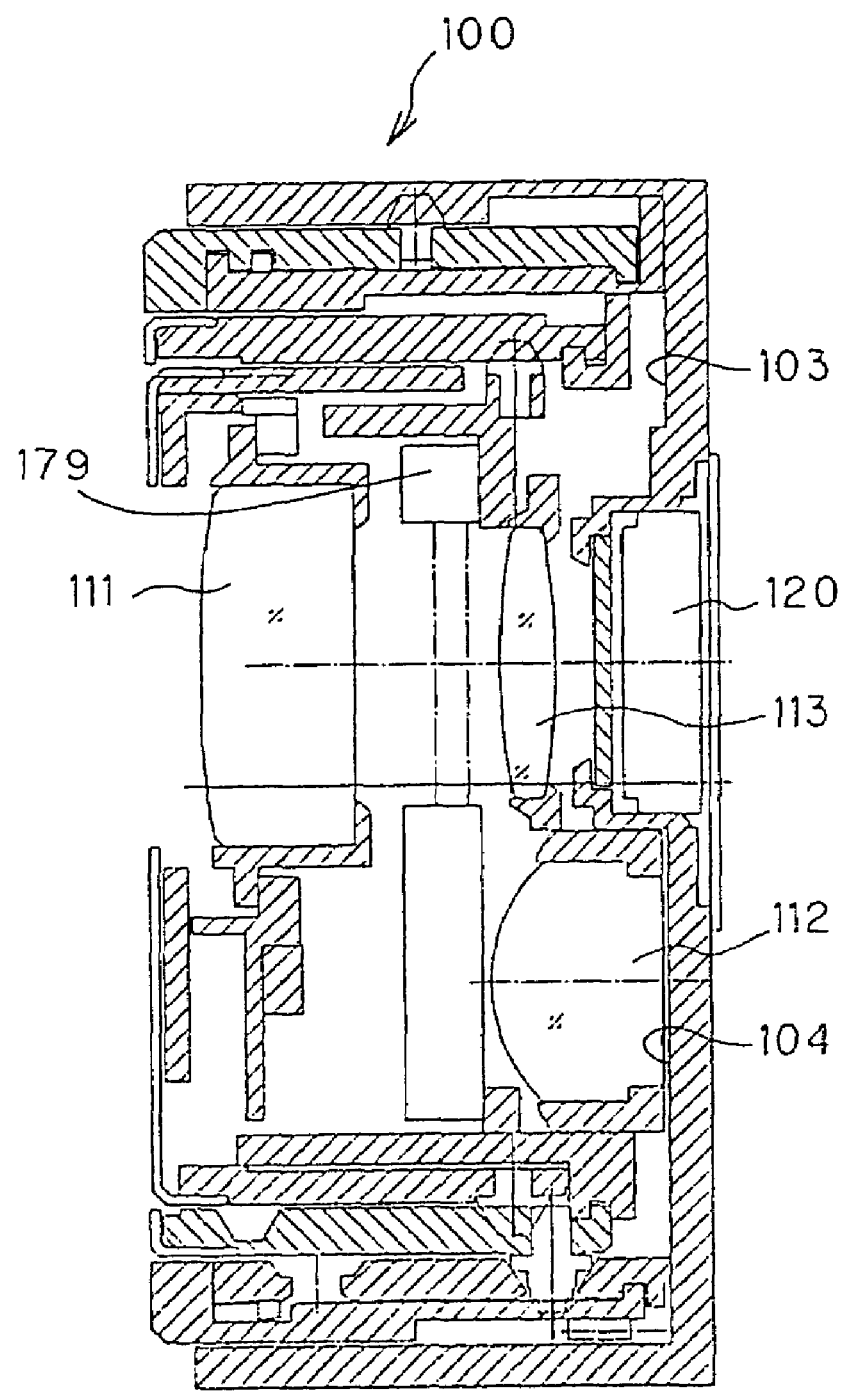
FIG. 12 is a sectional view taken along the line C-C' of FIG. 11.
Figure 13:
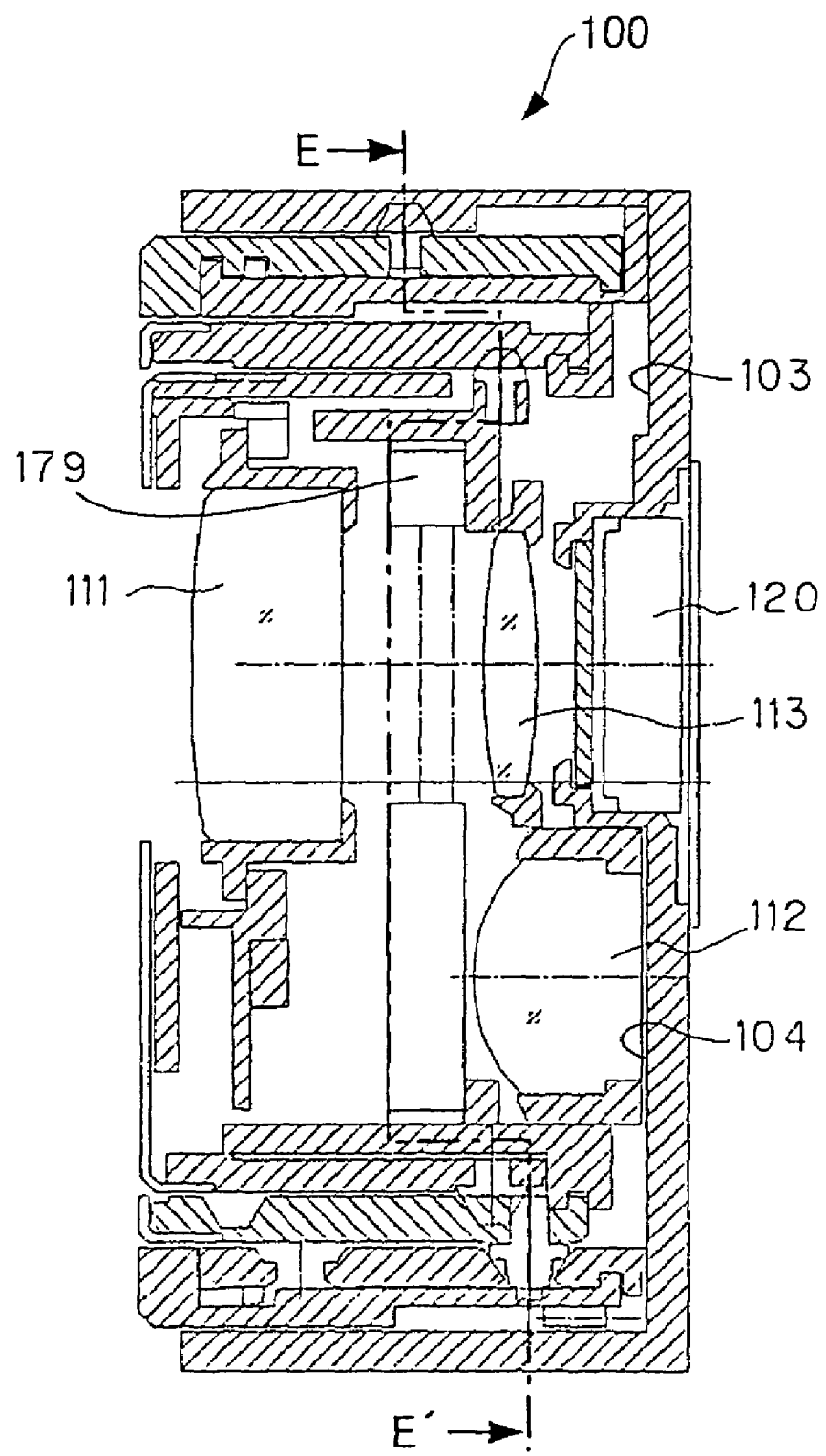
FIG. 13 is a view showing the line E-E' on the same sectional view as FIG. 12.
Figure 14:
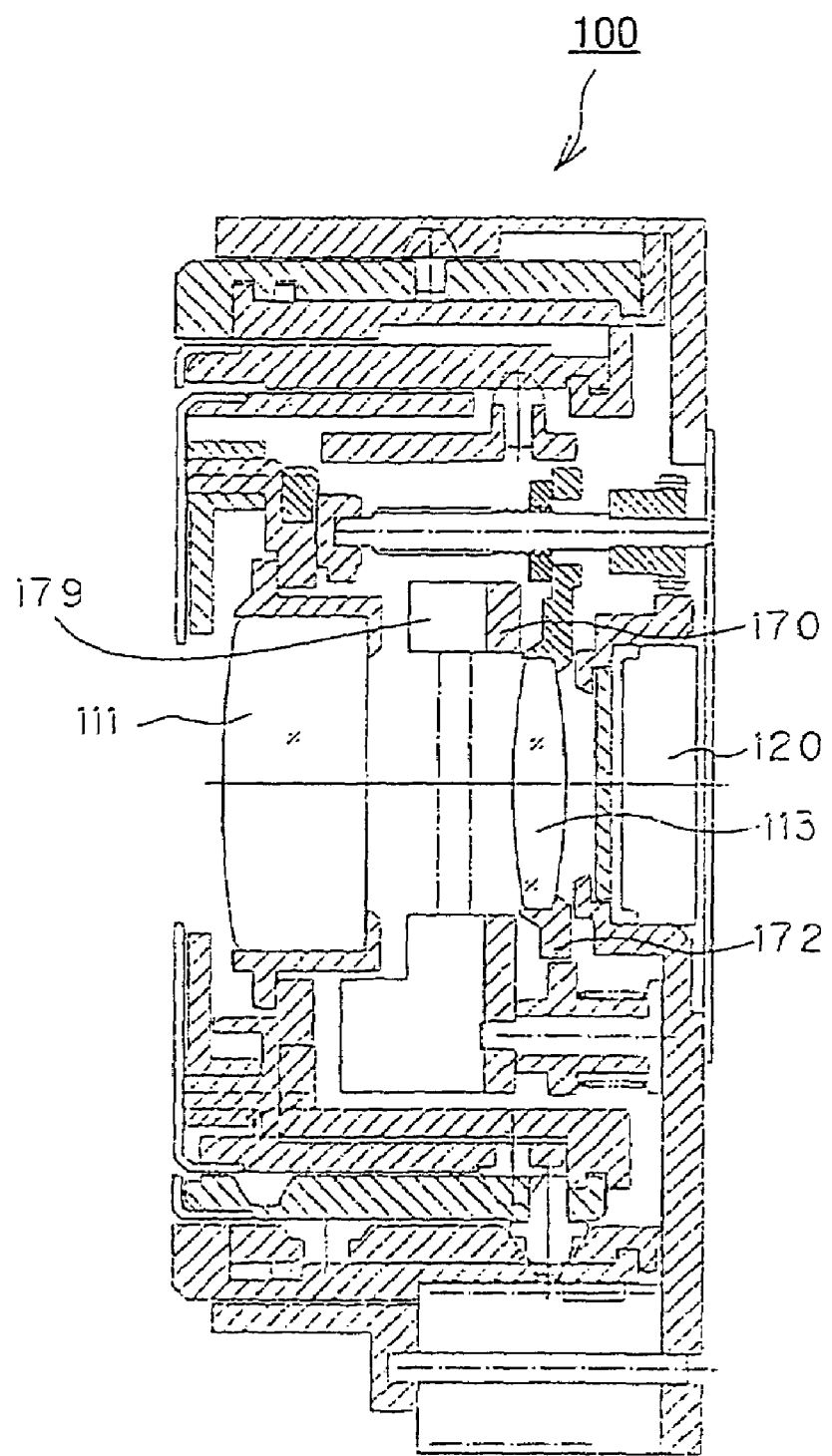
FIG. 14 is a sectional view taken along the line B-B' of FIG. 11.

FIG. 3 is a typical illustration showing main parts of the digital camera of the first embodiment of the present invention, looking from an optical axis direction a lens barrel in a state of an extension. And FIG. 3 is a sectional view taken along the line F-F' in FIG. 7 which will be described later. FIG. 4 is a view showing the line A-A' on the same sectional view as FIG. 3. FIG. 5 is a view showing the line D-D' on the same sectional view as FIG. 3. In the following figures, in order to avoid troublesomeness and complication of the figures, there will sort out figures for explanation with reference numbers and figures to which lines are applied. FIG. 6 is a sectional view showing a state of a tele-edge where the focal length is longest, taken along the line A-A' in FIG. 4. FIG. 7 is a view showing the line F-F' on the same sectional view as FIG. 6. FIG. 8 is a sectional view showing a state of a wide-edge where the focal length is shortest, taken along the line A-A' in FIG. 4. FIG. 9 is a sectional view showing main parts in a state of the wide-edge, taken along the line D-D' in FIG. 5. FIG. 10 is a typical illustration showing main parts of the digital camera of the first embodiment of the present invention shown in FIG. 1 to FIG. 9, looking from an optical axis direction a lens barrel in a state of a collapse. And FIG. 10 is a sectional view taken along the line E-E' in FIG. 13 which will be described later. FIG. 11 is a view showing the line B-B' and the line C-C' on the same sectional view as FIG. 10. FIG. 12 is a sectional view taken along the line C-C' of FIG. 11. FIG. 13 is a view showing the line E-E' on the same sectional view as FIG. 12. FIG. 14 is a sectional view taken along the line B-B' of FIG. 11.

Hereinafter, the explanation will be continued mainly referring to FIG. 6 and in addition other figures as the demand arises.

An internal space 101 of a lens barrel 100 shown in FIG. 3 to FIG. 14 stores therein a image taking lens 110 comprising three groups of a front elements lens 111, a rear elements lens 112, and a focus lens 113 in the named order with respect to the optical axis direction. The image taking lens 110 is so arranged that a movement of the rear elements lens 112 between the tele-edge shown in FIG. 6 and the wide-edge shown in FIG. 8 makes it possible to vary the focal length, and a movement of the focus lens 113 in the optical axis direction makes it possible to perform a focusing.

At the front of the internal space, there is formed an aperture 102 through which the image taking lens 110 appears. At the rear of the internal space, there is disposed a wall member 103, which is fixed on a camera body, or which constitutes a part of the camera body. The internal space 101 is defined in its outline by the member 103 and a plurality of cylindrical members that will be described later.

A CCD solid state imaging device (hereinafter, it will be simply referred to as CCD) 120 is mounted on the wall member 103 in a state that the CCD 120 projects onto the internal space 101. The disposition of the CCD 120 at the position projecting onto the internal space 101 may form a hollow portion 104 divided by the CCD 120 and the wall member 103 by the side of the CCD 120.

A feed screw 131 is rotatably supported on the wall member 103. A nut member 132 is engaged with the feed screw 131. A focus lens holding frame 133 for holding the focus lens 113 is fixed on the nut member 132. A focus motor (not illustrated) provided on the camera body side drives the feed screw 131. The focus lens 113 moves in an optical axis direction by the rotation of the feed screw 131 to adjust the position of the focus lens 113 so that a subject image focused is projected on the front of the CCD 120.

A fixed cylinder 140 is fixed on the wall member 103. Inside the fixed cylinder 140 there is provided a rotary cylinder 150. The rotary cylinder 150 is provided with gear wheels 151, which mesh with pole-shaped gears 105 (cf. FIG. 3), around. A barrel driving motor (not illustrated) drives the pole-shaped gears 105 so that the rotary cylinder 150 rotates. On the inside wall of the fixed cylinder 140 there is formed a cam groove 141 with which a cam pin 152, which is fixed on the c, is engaged. Accordingly, when the rotary cylinder 150 receives a rotary driving force via the pole-shaped gears 105, the rotary cylinder 150 goes ahead or goes back in an optical axis while rotating.

Inside the rotary cylinder 150 there is provided a rotary cylinder side progressive key-ring 154 in such a way that the rotary cylinder side progressive key-ring 154 is rotatably with respect to the rotary cylinder 150, but inhibited from the relative movement to the rotary cylinder 150 in the optical axis direction. A key plate 155 is fixed on the rotary cylinder side progressive key-ring 154. The key plate 155 is engaged with a key groove 142 extending in the optical axis direction, which is formed on the inner wall of the fixed cylinder 140, whereby the rotary cylinder side progressive key-ring 154 is inhibited from being rotated on the fixed cylinder 140 while it is permitted to move in the optical axis direction. Accordingly, when the rotary cylinder 150 moves in the optical axis direction while rotating, the rotary cylinder side progressive key-ring 154 does not rotate since it is inhibited from being rotated on the fixed cylinder 140, but moves in the optical axis direction together with the rotary cylinder 150.

Further, inside the rotary cylinder 150 there is provided an intermediate cylinder 160 that is rotatable. At the inner wall of the rotary cylinder 150, there is formed a cam groove 156. Further, also at the rotary cylinder side progressive key-ring 154 there is formed a cam groove 157 penetrating through its outer periphery and inner periphery. The cam groove 156 of the rotary cylinder 150 is engaged with a cam pin 161 provided on the intermediate cylinder 160 in such a manner that the cam pin 161 penetrates through the cam groove 157 of the rotary cylinder side progressive key-ring 154. Thus, when the rotary cylinder 150 moves in the optical axis direction while rotating, the intermediate cylinder 160 also moves in the optical axis direction relatively to the rotary cylinder 150 while rotating in accordance with a geometry of the cam grooves of the rotary cylinder 150 and the rotary cylinder side progressive key-ring 154.

Inside the intermediate cylinder 160 there is disposed an intermediate cylinder side progressive key-ring 164. At the rotary cylinder side progressive key-ring 154 there is formed a progressive key 158. The intermediate cylinder side progressive key-ring 164 is engaged with the progressive key 158 of the rotary cylinder side progressive key-ring 154. The intermediate cylinder side progressive key-ring 164 is rotatable relatively with respect to the intermediate cylinder 160, but is inhibited in a relative movement in the optical axis direction with respect to the intermediate cylinder 160. Accordingly, when the intermediate cylinder 160 moves in the optical axis direction relatively with respect to the rotary cylinder 150 while rotating, the intermediate cylinder side progressive key-ring 164 progressively moves in the optical axis direction with the movement of the intermediate cylinder 160 in the optical axis direction, without rotation.

At the inner wall of the intermediate cylinder 160, there is formed a cam groove 165 for guiding a rear elements guide frame 170. The cam groove 165 is engaged with a cam pin 171 fixed on the rear elements guide frame 170 in a state that the cam pin 171 is inhibited from being rotated with respect to the intermediate cylinder side progressive key-ring 164. Accordingly, when the intermediate cylinder 160 rotates, the rear elements guide frame 170 progressively moves in the optical axis direction in accordance with the geometry of the cam groove 165 of the inner wall of the intermediate cylinder 160.

A shutter unit 179 is fixed on the rear elements guide frame 170 in the optical axis direction ahead. The shutter unit 179 is provided with an aperture member for controlling a light quantity of the subject light passing through the image taking lens 110 in such a manner that an aperture caliber is controlled, and a shutter member for controlling a light quantity of the subject light passing through the image taking lens 110 in such a manner that a shutter speed is controlled.

In the optical axis direction behind, a rear elements holding frame 172 for holding the rear elements lens 112 is pivotally supported by a rotary shaft 173 so as to be rotatably movable with respect to the rear elements guide frame 170. A rotatably movable range of the rear elements holding frame 172 is a range that the rear elements lens 112 held in the rear elements holding frame 172 rotates between a use position (cf. FIG. 6 and FIG. 8) in which the rear elements lens 112 advances on the optical axis of the image taking lens 110 and a saving position (cf. FIG. 12) in which the rear elements lens 112 comes in the hollow portion 104 beside the CCD 120. There is provided a coil spring 174 around the rotary shaft 173. The rear elements holding frame 172 is enabled by the coil spring 174 in a direction in which the rear elements lens 112 rotates on the optical axis of the image taking lens 110 and also in the optical axis direction.

With respect to a mechanism in which when the rear elements holding frame 172 rotatably moves, the rear elements lens 112 rotates and saves in the saving position set up in the hollow portion 104, it will be explained later.

At the intermediate cylinder 160, there is formed an additional cam groove 166 for guiding a front elements frame 180 holding the front elements lens 111. A cam pin 181, which is provided on the front elements frame 180, comes in the cam groove 166. The front elements frame 180 is inhibited from being rotated on the intermediate cylinder side progressive key-ring 164 but is permitted in a movement in the optical axis direction. Accordingly, when the intermediate cylinder 160 rotates, the front elements frame 180 progressively moves in the optical axis direction with respect to the intermediate cylinder 160 in accordance with the geometry of the cam groove 166.

With this mechanism, when the rear elements lens 112 is in the state of the tele-edge shown in FIG. 6, a transmission of the rotary driving force in the collapse direction via the pole-shaped gears 105 to the rotary cylinder 150 may collapse the image taking lens from the state of the tele-edge shown in FIG. 6 via the state of the wide-edge shown in FIG. 8 to the collapsed state shown in FIG. 12 and FIG. 14. Reversely, when the image taking lens is in the state of the collapsed state shown in FIG. 12 and FIG. 14, a transmission of the rotary driving force in the extension direction to the rotary cylinder 150 may extend the image taking lens from the collapsed state shown in FIG. 12 and FIG. 14 to the state of the wide-edge shown in FIG. 8, and offers the state of the tele-edge shown in FIG. 6 via the state of the wide-edge.

When a photograph is taken, the above-mentioned zoom operation switch is operated to control a focal length between the tele-edge shown in FIG. 6 and the wide-edge shown in FIG. 8, so that a desired photographic angle of view is set up. The focus lens 113 is subjected to focusing to the position wherein the best contrast is obtained by the contrast detection according to the image signal obtained in the CCD 120. Thereafter, when the shutter button is depressed, the CCD 120 creates an image signal representative of the subject, and the image signal is subjected to a suitable processing and then recorded.

Next, there will be explained the mechanism in which at the time of collapse, the rear elements lens 112 is revolved to the saving position.

The rear elements holding frame 172 for holding the rear elements lens 112 is pivotally supported by the rotary shaft 173 so as to be rotatably movable with respect to the rear elements guide frame 170, as mentioned above. And the rear elements holding frame 172 is enabled by the coil spring 174 in a direction in which the rear elements lens 112 is located on the optical axis of the image taking lens 110. A lever member 175 shown in FIG. 3 and FIG. 9 is pivotally supported by a rotary shaft 176 so as to be rotatably movable with respect to the rear elements guide frame 170. The rear elements holding frame 172 is provided with a fork-shaped engagement groove 178 as shown in FIG. 3. An engagement pin 177, which is provided on one end of the lever member 175, comes into the engagement groove 178.

On the wall member 103 defining the rear of the internal space 101 of the lens barrel 100, as shown in FIG. 9, there is formed a convex portion 205, which projects to the internal space 101, in the collapse direction travelling tracks of an edge 175a opposite to the direction wherein the engagement pin 177 of the lever member 175 is provided. And on the tip of the convex portion 205 there is provided a taper plane 205a. Accordingly, when the rotary cylinder 150 rotates in the collapse direction, the intermediate cylinder 160 and the rear elements guide frame 170 cam-engaged with the intermediate cylinder 160 also move in the collapse direction and the edge 175a of the lever member 175 hits the taper plane 205a of the convex portion 205 and moves along the taper plane 205a, so that the lever member 175 rotatably moves from the rotary position shown in FIG. 3 to the rotary position shown in FIG. 10. Since the pin 177 of the lever member 175 comes into the fork-shaped engagement groove 178 of the rear elements holding frame 172, the rear elements holding frame 172 also rotatably moves around the rotary shaft 173, so that the rear elements lens 112 is saved from the position on the optical axis shown in FIG. 3 to a save position out of the optical axis, as shown in FIG. 10. The save position is the hollow portion 104 formed by the side of the CCD 120, as shown in FIG. 12.

When the lens barrel 100 moves from the collapsed state shown in FIG. 12 and FIG. 14 in the extension state, the convex portion 205 projecting from the wall member 103, which is shown in FIG. 9, is disengaged from the lever member 175, so that the rear elements holding frame 172 rotatably moves by enabling of the coil spring 174 from the state shown in FIG. 10 to the state shown in FIG. 3, whereby the rear elements lens 112 revolves from the saving position shown in FIG. 10 to the position (cf. FIG. 3) in the optical axis.

According to the first embodiment, as mentioned above, at the time of the collapse, an effect of the convex portion 205 of the wall member 103 is applied to the lever member 175, so that the rear elements lens 112 is saved to the hollow portion 104 by the side of the CCD 120. In case of the digital camera having the conventional collapse and extension mechanism which has no mechanism for saving a image taking lens from an optical axis wherein the image taking lens is collapsed while being disposed on the optical axis, the hollow portion is apt to be a dead space. To the contrary, according to the present embodiment, the rear elements lens 112 is out of the optical axis and is saved to the hollow portion 104. Thus, the hollow portion 104 is effectively used and thereby implementing further thinness of the lens structure as compared with the conventional ones.

Figure 15:
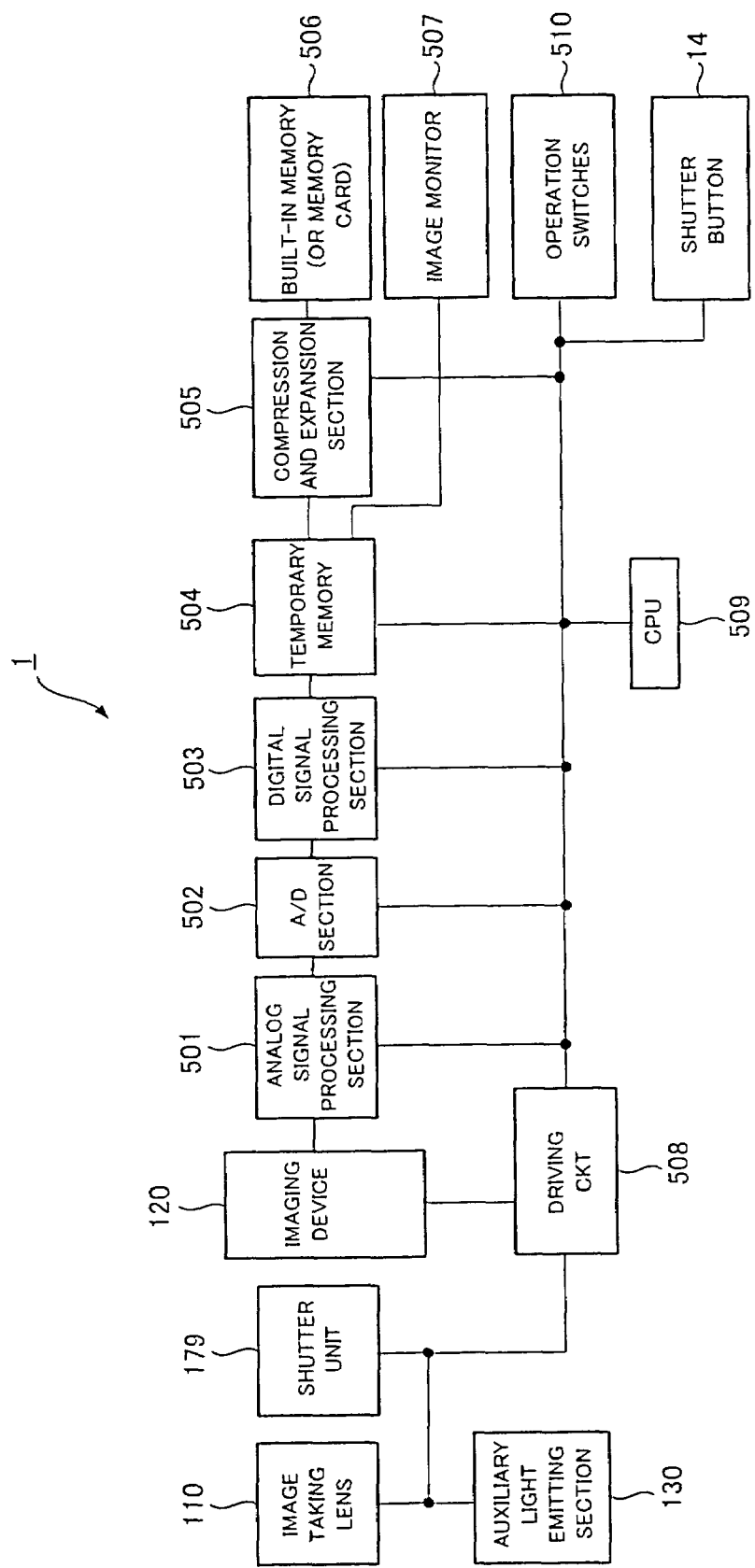
FIG. 15 is a block diagram of a circuit structure of the digital camera shown in FIG. 1 to FIG. 14.

FIG. 15 is a block diagram of a circuit structure of the digital camera shown in FIG. 1 to FIG. 14.

The digital camera 1 is provided with the image taking lens 110, the shutter unit 179, and the CCD imaging device 120, as mentioned above. A subject image formed on the CCD imaging device 120 via the image taking lens 110 and the shutter unit 179 is converted into an analog image signal by the CCD imaging device 120. The shutter unit 179 serves to suppress generation of smear due to light when analog signals are read from the CCD imaging device 120.

The digital camera 1 is further provided with an auxiliary light emitting section 130. The auxiliary light emitting section 130 emits an auxiliary light at the time of a low illumination. The auxiliary light emitting section 130 may emit the auxiliary light at any necessary time other than the low illumination.

The digital camera 1 is further provided with an analog signal processing section 501, an A/D section 502, a digital signal processing section 503, a temporary memory 504, a compression and expansion section 505, a built-in memory (or a memory card) 506, an image monitor 507, and a driving circuit 508. The CCD imaging device 120 is driven by a timing generated from a timing generating circuit (not illustrated) of the driving circuit 508, and outputs an analog image signal. The driving circuit 508 includes driving circuits for driving the image taking lens 110, the shutter unit 179 and the auxiliary light emitting section 130. The analog image signal outputted from the CCD imaging device 120 is subjected to an analog signal processing by the analog signal processing section 501, an A/D conversion by the A/D section 502, and a digital signal processing by the digital signal processing section 503. Data representative of the signal subjected to the digital signal processing is temporarily stored in the temporary memory 504. The data stored in the temporary memory 504 is compressed by the compression and expansion section 505 and is recorded into the built-in memory (or a memory card) 506. Incidentally, in some photographic mode, it is acceptable that the data is recorded directly into the built-in memory 506 omitting the process of the compression. The data stored in the temporary memory 504 is read to the image monitor 507 so that an image of the subject is displayed on the image monitor 507.

The digital camera 1 is further provided with a CPU 509 for controlling the camera in its entirety, operation switches 510 including a zoom operation switch, and a shutter button 14. Photography is performed when the shutter button 14 is depressed through setting to a desired photographic state including setting to a desired angle of view by operation of the operation switches 510.

Next, there will be explained other embodiments of the present invention. The perspective view and the circuit structure of the digital camera of the following embodiment are the same as the perspective view (cf. FIG. 1 and FIG. 2) and the schematic circuit structure (cf. FIG. 15) of the digital camera of the first embodiment, and thus here there will be explained only the lens barrel which is different therebetween. In the following figures, the same parts are denoted by the same reference numbers as those of FIG. 3 to FIG. 14, and the redundant explanation will be omitted.

Figure 16:
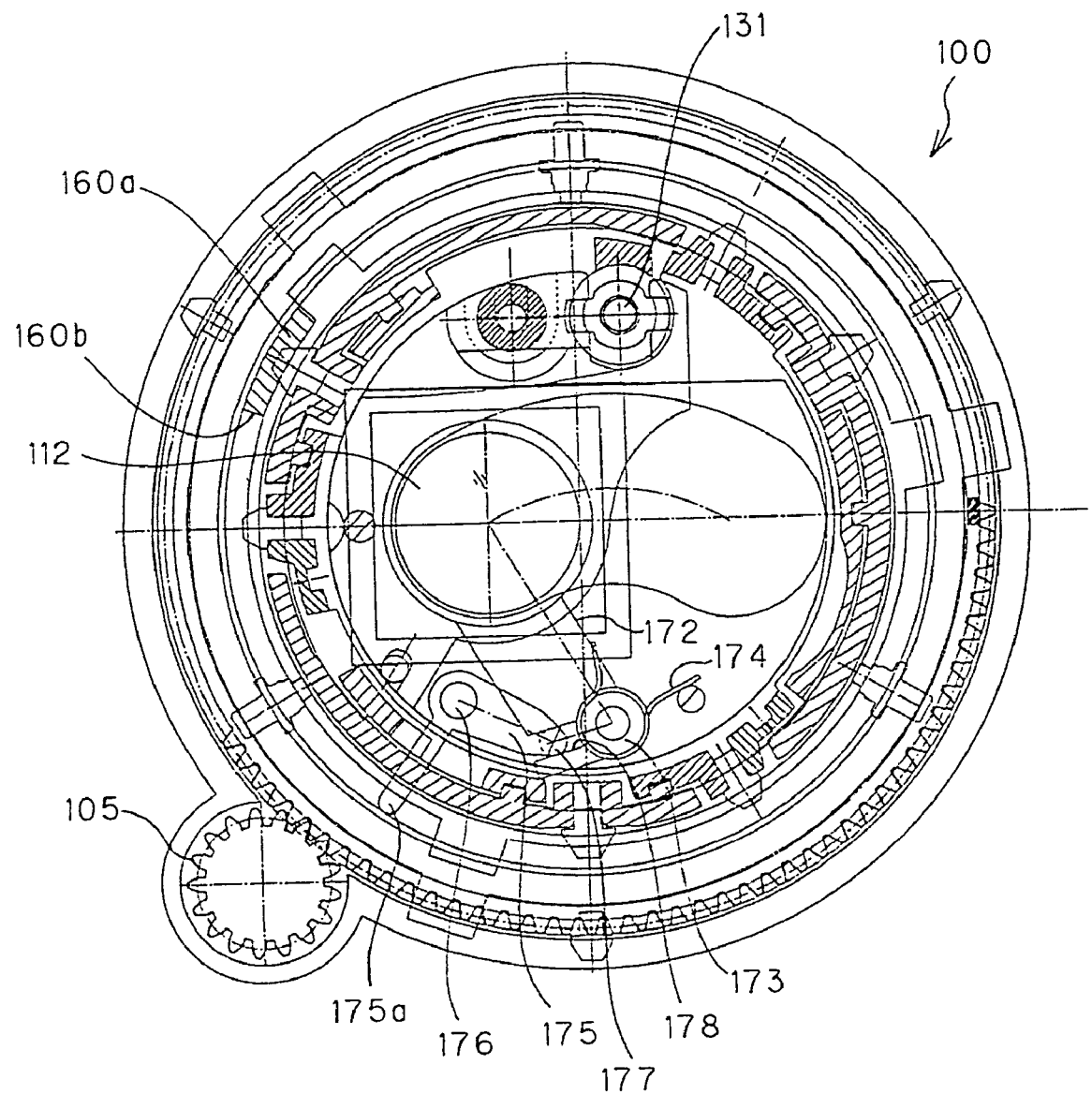
FIG. 16 is a typical illustration showing main parts of the digital camera of a second embodiment of the present invention, looking from an optical axis direction a lens barrel in a state of an extension.
Figure 17:
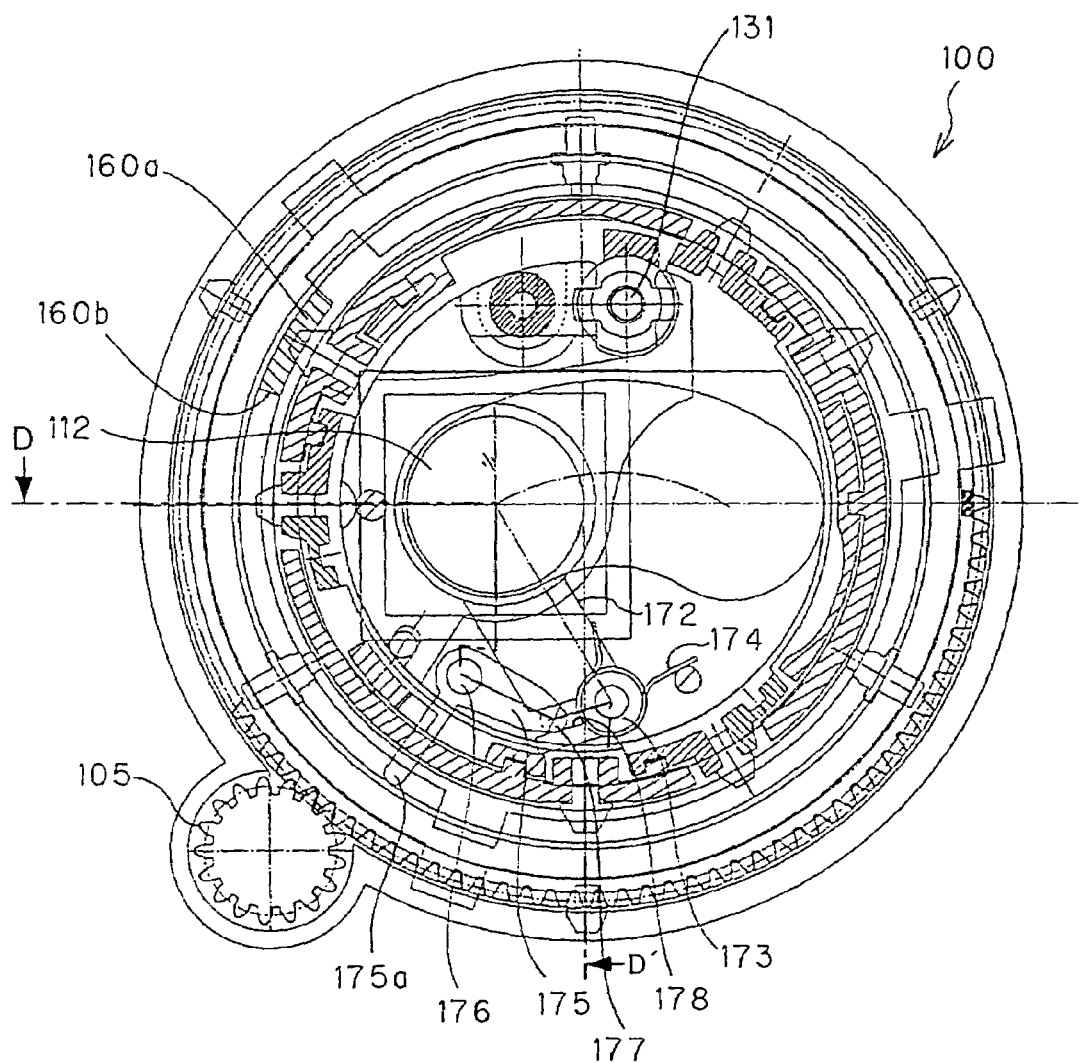
FIG. 17 is a view showing the line D-D' on the same sectional view as FIG. 16.
Figure 18:
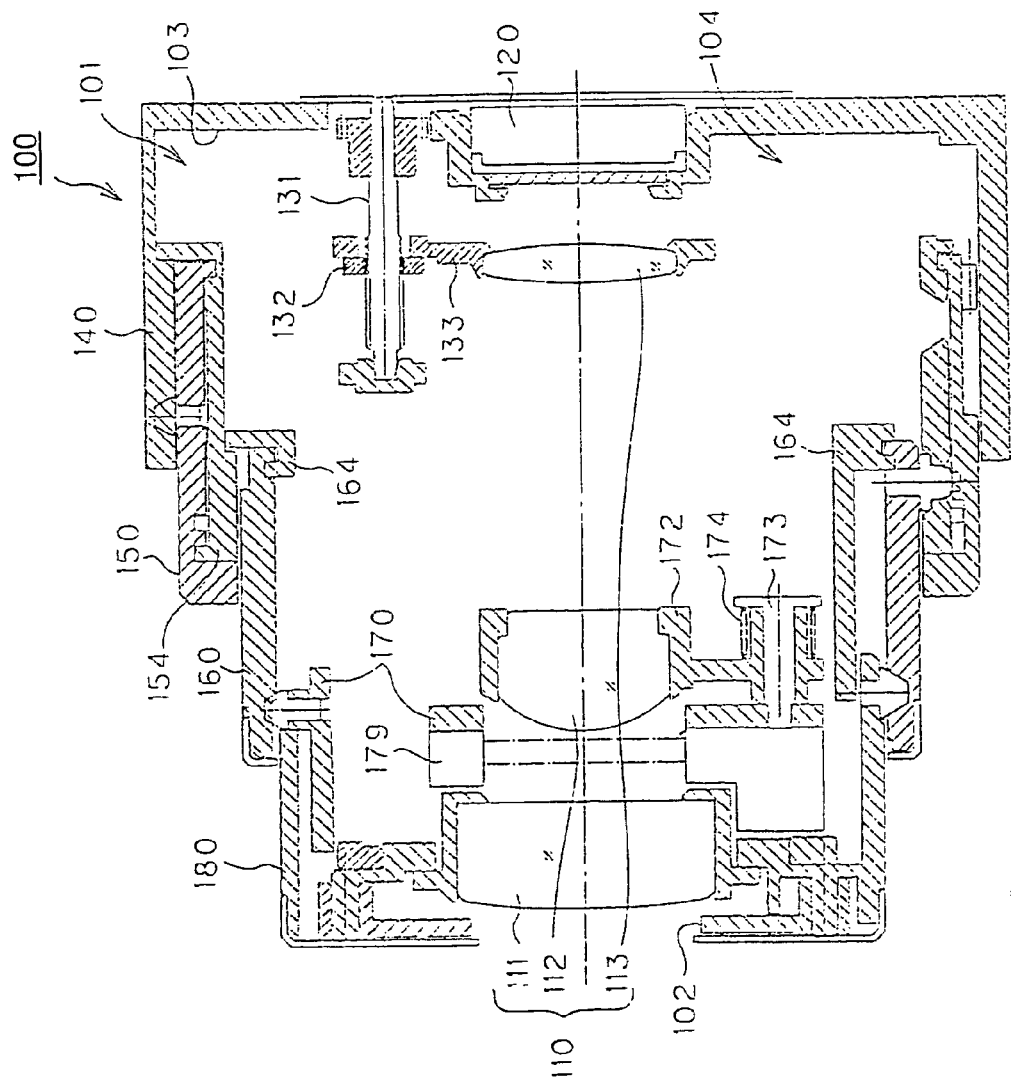
FIG. 18 is a sectional view showing a state of a tele-edge where the focal length is longest, taken along the same line as the line A-A' in FIG. 4 related to the first embodiment.
Figure 19:
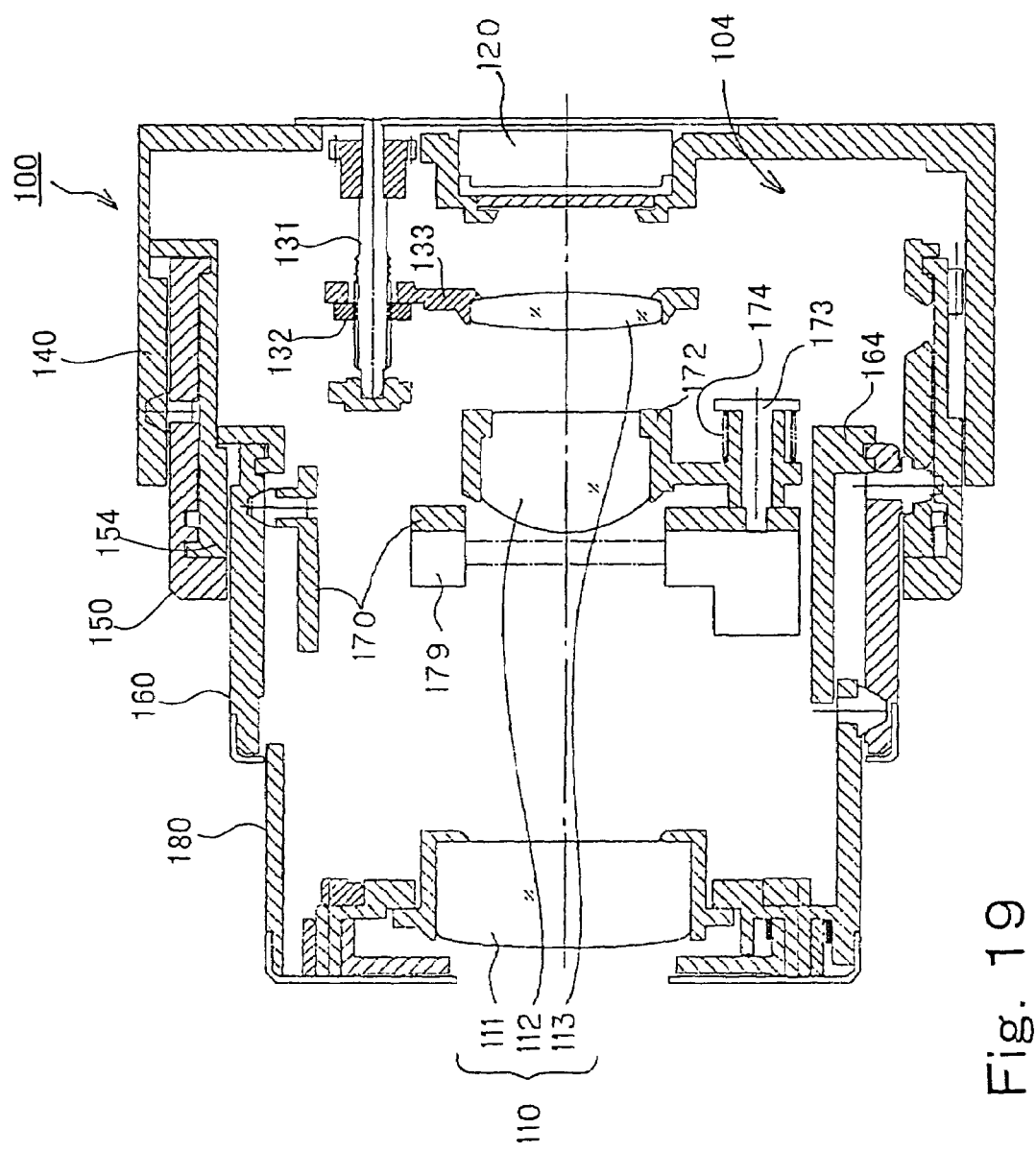
FIG. 19 is a sectional view showing a state of a wide-edge where the focal length is shortest, taken along the same line as FIG. 18.
Figure 20:
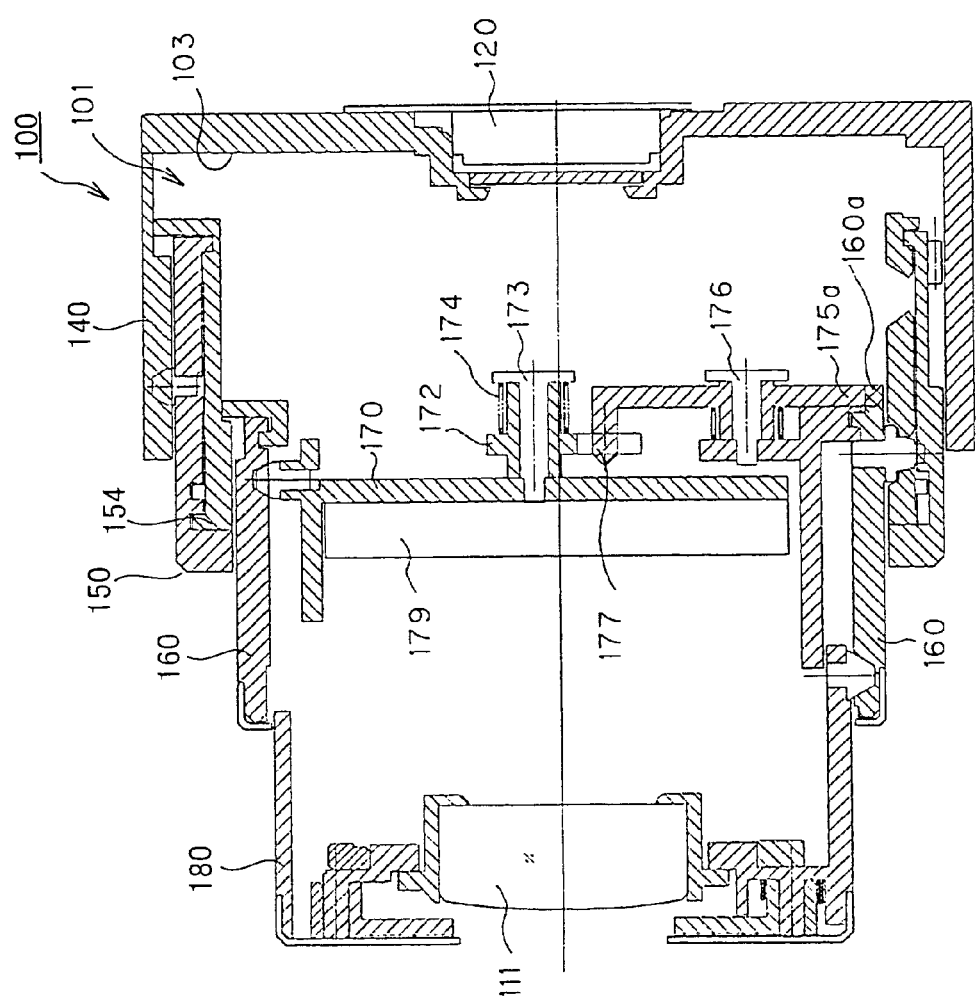
FIG. 20 is a sectional view showing main parts in a state of the wide-edge, taken along the line D-D' in FIG. 17.
Figure 21:
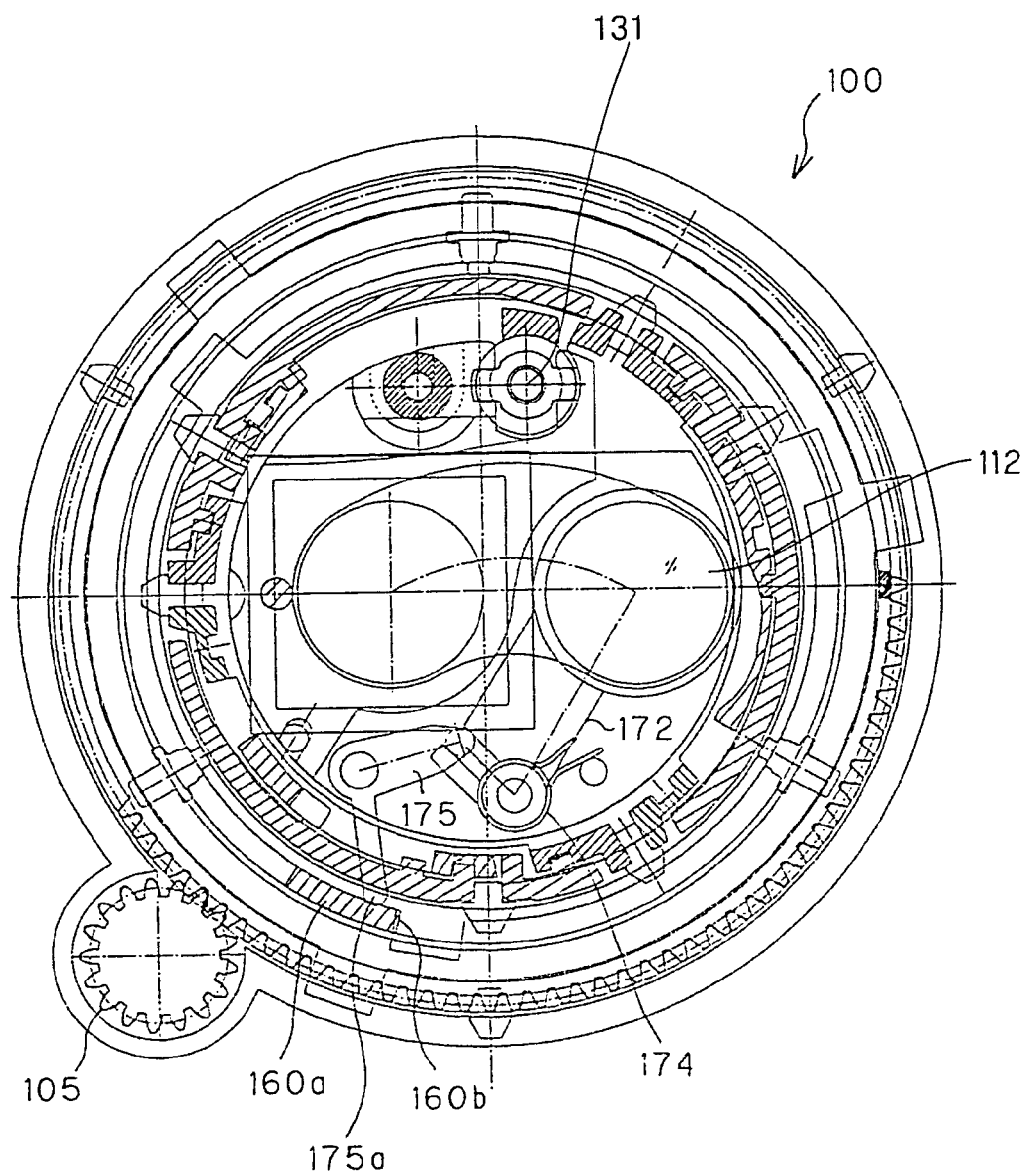
FIG. 21 is a typical illustration showing main parts of the digital camera of the second embodiment of the present invention, looking from an optical axis direction a lens barrel in a state of a collapse.
Figure 22:
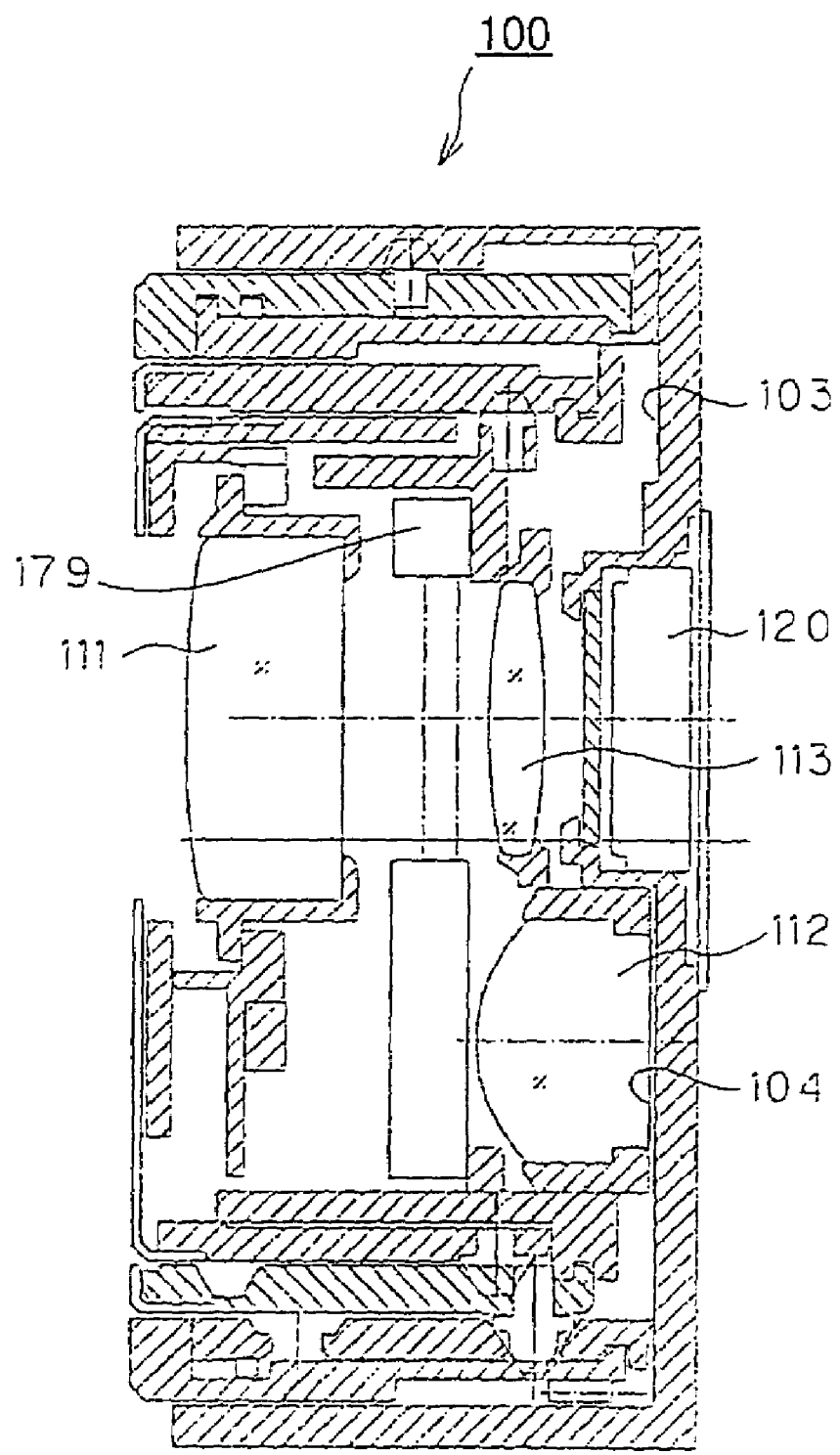
FIG. 22 is a sectional view taken along the same line as the line C-C' shown in FIG. 11 related to the first embodiment.
Figure 23:
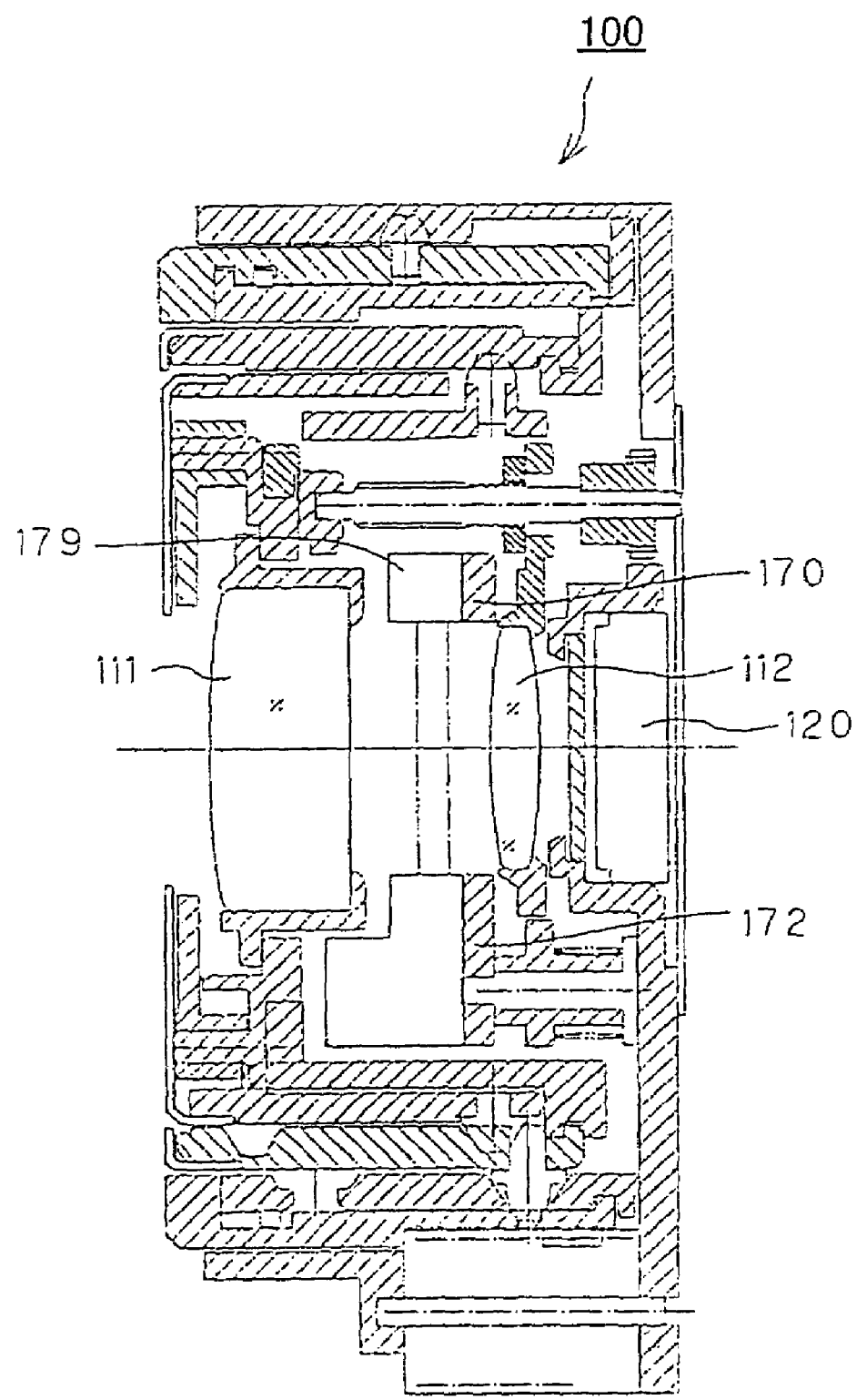
FIG. 23 is a sectional view taken along the same line as the line B-B' shown in FIG. 11 related to the first embodiment.

FIG. 16 is a typical illustration showing main parts of the digital camera of a second embodiment of the present invention, looking from an optical axis direction a lens barrel in a state of an extension. And FIG. 16 is a sectional view taken along the same line as the line F-F' in FIG. 7 related to the above-mentioned first embodiment associated with FIG. 18 which will be described later. FIG. 17 is a view showing the line D-D' on the same sectional view as FIG. 16. FIG. 18 is a sectional view showing a state of a tele-edge where the focal length is longest, taken along the same line as the line A-A' in FIG. 4 related to the first embodiment associated with FIG. 16. FIG. 19 is a sectional view showing a state of a wide-edge where the focal length is shortest, taken along the same line as FIG. 18. FIG. 20 is a sectional view showing main parts in a state of the wide-edge, taken along the line D-D' in FIG. 17. FIG. 21 is a typical illustration showing main parts of the digital camera of the second embodiment of the present invention as shown in FIG. 16 to FIG. 20, looking from an optical axis direction a lens barrel in a state of a collapse. And FIG. 21 is a sectional view taken along the same line as the line E-E' shown in FIG. 13 related to the above-mentioned first embodiment associated with FIG. 22 which will be described later. FIG. 22 is a sectional view taken along the same line as the line C-C' shown in FIG. 11 related to the first embodiment. FIG. 23 is a sectional view taken along the same line as the line B-B' shown in FIG. 11 related to the first embodiment.

In case of the second embodiment, as will be seen from FIG. 20, which corresponds to FIG. 9 related to the first embodiment, there is provided no convex portion 205, which projects from the wall member 103 to the internal space 101.

Instead, as shown in FIG. 16 and FIG. 20, there is provided a convex portion 160*a* projecting backward on the rear edge of the intermediate cylinder 160. And one edge 175*a* of the lever member 175 extends to a position in which the edge 175*a* engages with the convex portion 160*a* of the intermediate cylinder 160.

At the time of the collapse, the convex portion 160*a* of the intermediate cylinder 160 rotatably moves from the position shown in FIG. 16 to the position shown in FIG. 21. On the way of the rotatable movement, a side wall 160*b* of the convex portion 160*a* hits the lever member 175 on the edge 175*a*, so that the lever member 175 rotatably moves from the position shown in FIG. 16 to the position shown in FIG. 21, whereby the rear elements lens 112 held by the rear elements holding frame 172 revolves from the position on the optical axis shown in FIG. 16 to the saving position shown in FIG. 21.

On the other hand, when the lens barrel 100 moves from the collapsed state shown in FIG. 22 and FIG. 23 in the extension direction, the convex portion 160*a* of the intermediate cylinder 160 rotatably moves from the position shown in FIG. 21 to the position shown in FIG. 16. On the way of the rotatable movement, the convex portion 160*a* is disengaged from the lever member 175, so that the rear elements lens 112 revolves by the effect of the coil spring 174 from the saving position to the position on the optical axis.

This mechanism also makes it possible to remove the rear elements lens 112 from the optical axis to save the same to the hollow portion 104, in a similar fashion to that of the first embodiment.

Next, there will be explained the third embodiment. In a similar fashion to that of the second embodiment, there will be explained only the different points from the first embodiment.

Figure 24:
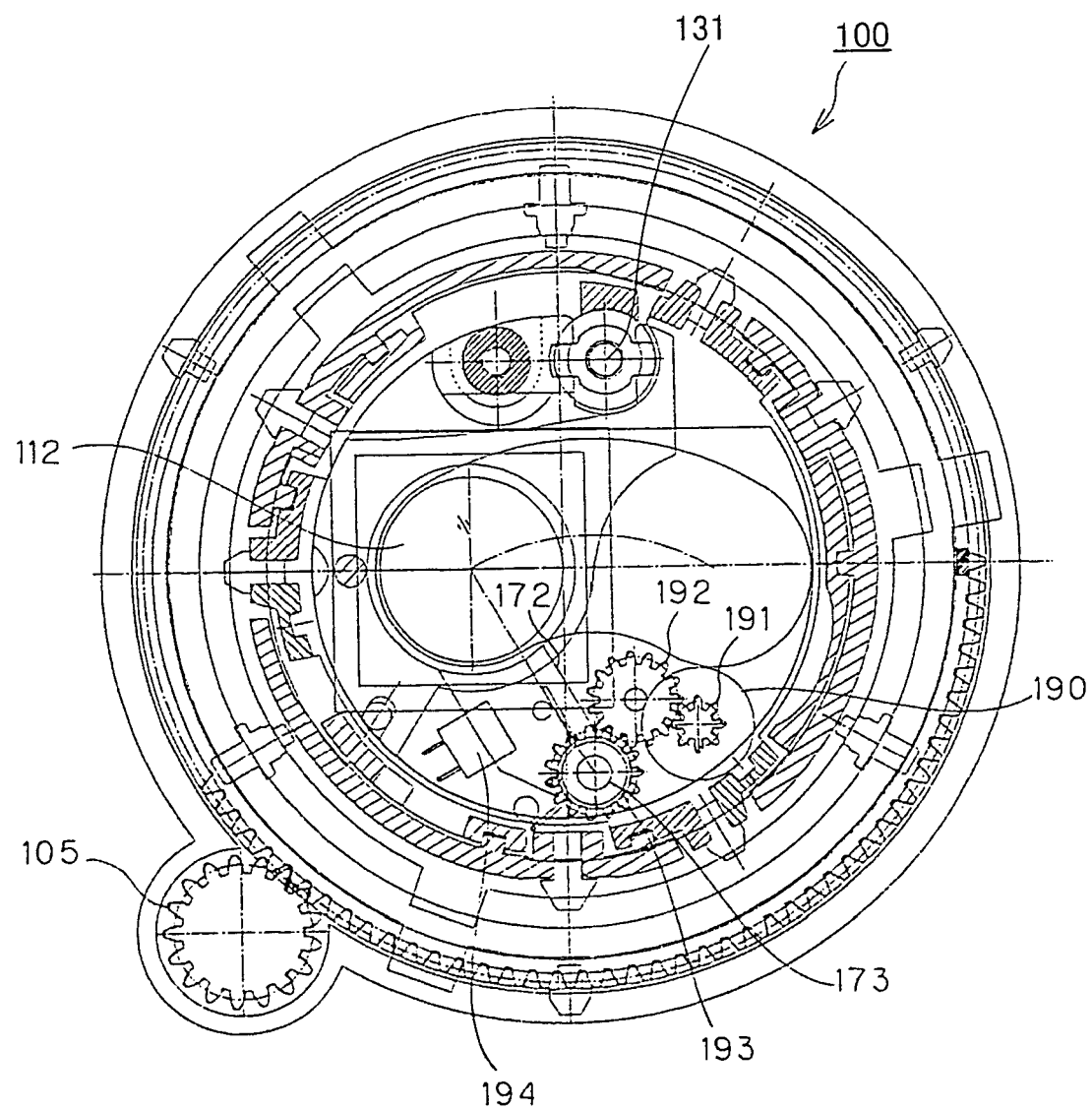
FIG. 24 is a typical illustration showing main parts of the digital camera of a third embodiment of the present invention, looking from an optical axis direction a lens barrel in a state of an extension.
Figure 25:
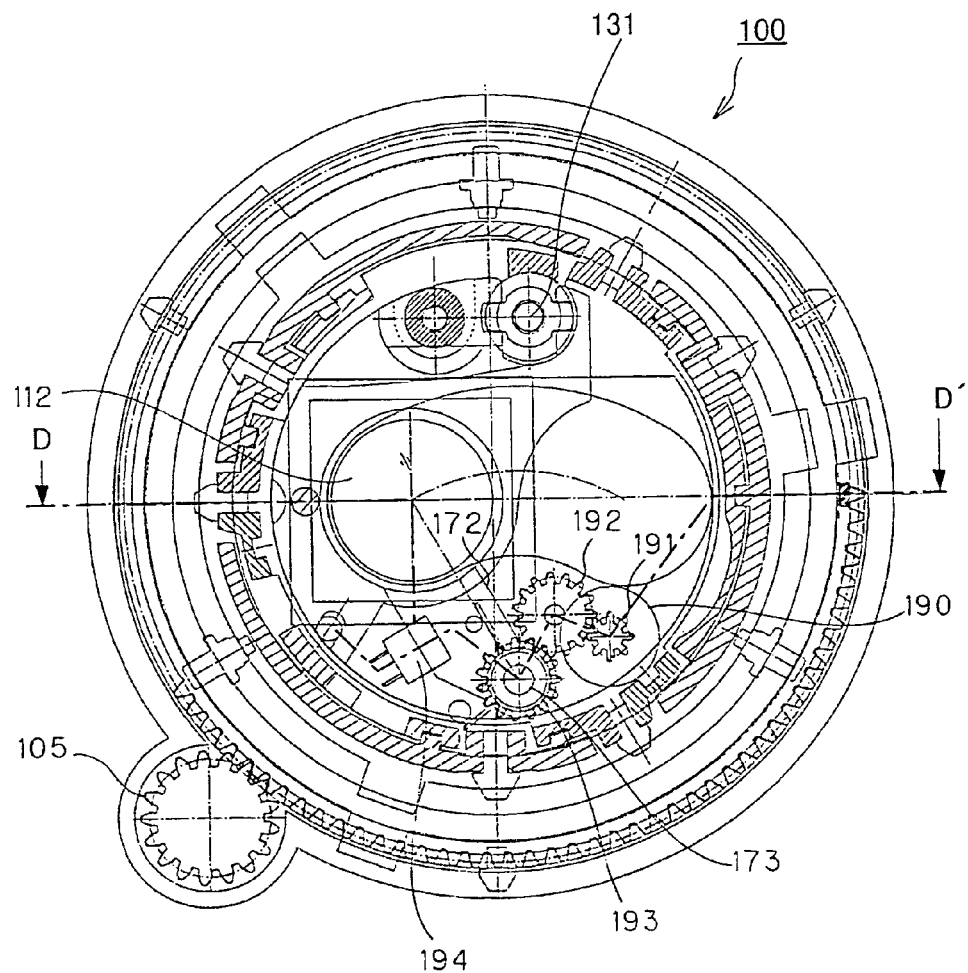
FIG. 25 is a view showing the line D-D' on the same sectional view as FIG. 24.
Figure 26:
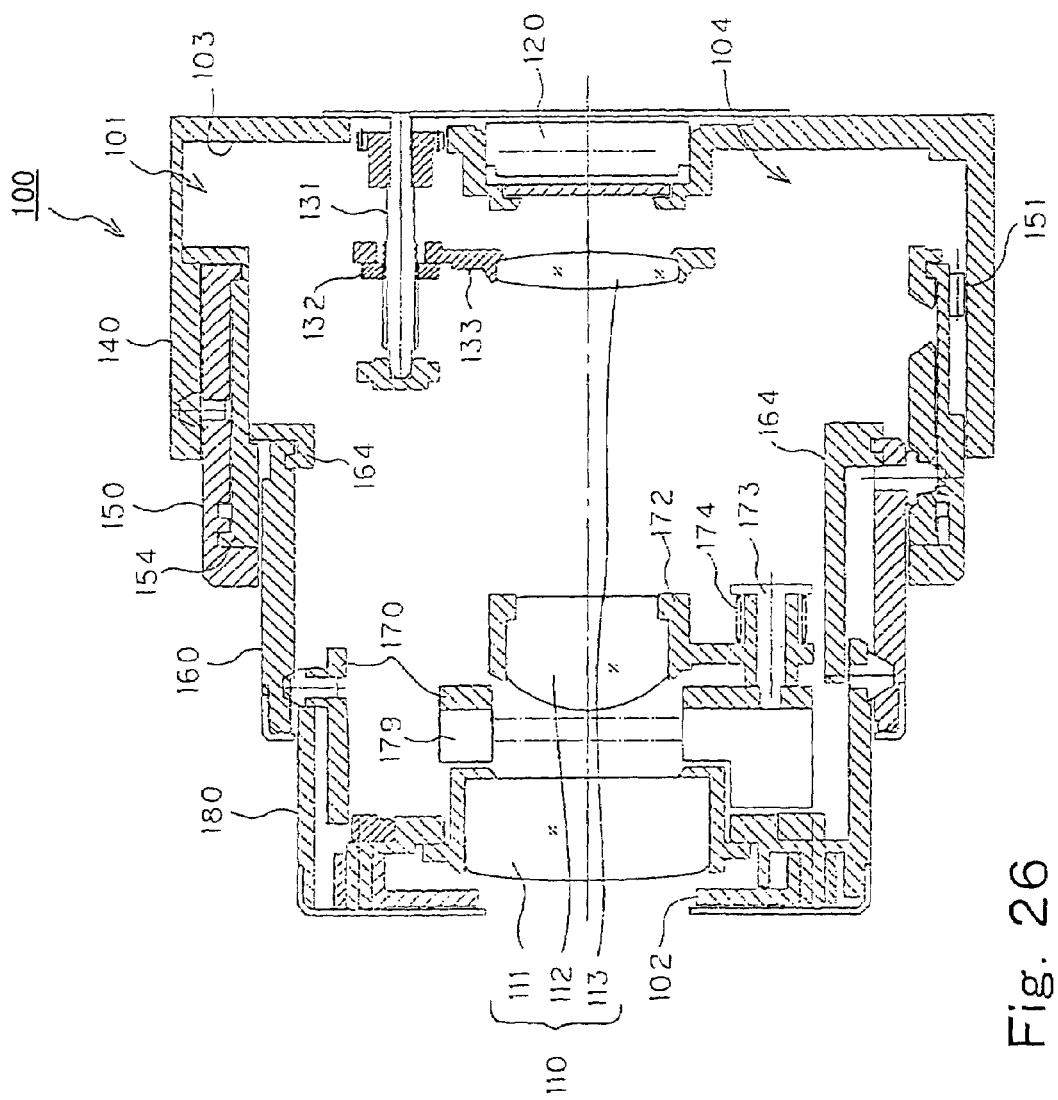
FIG. 26 is a sectional view showing a state of a tele-edge where the focal length is longest, taken along the same line as the line A-A' in FIG. 4 related to the first embodiment.
Figure 27:
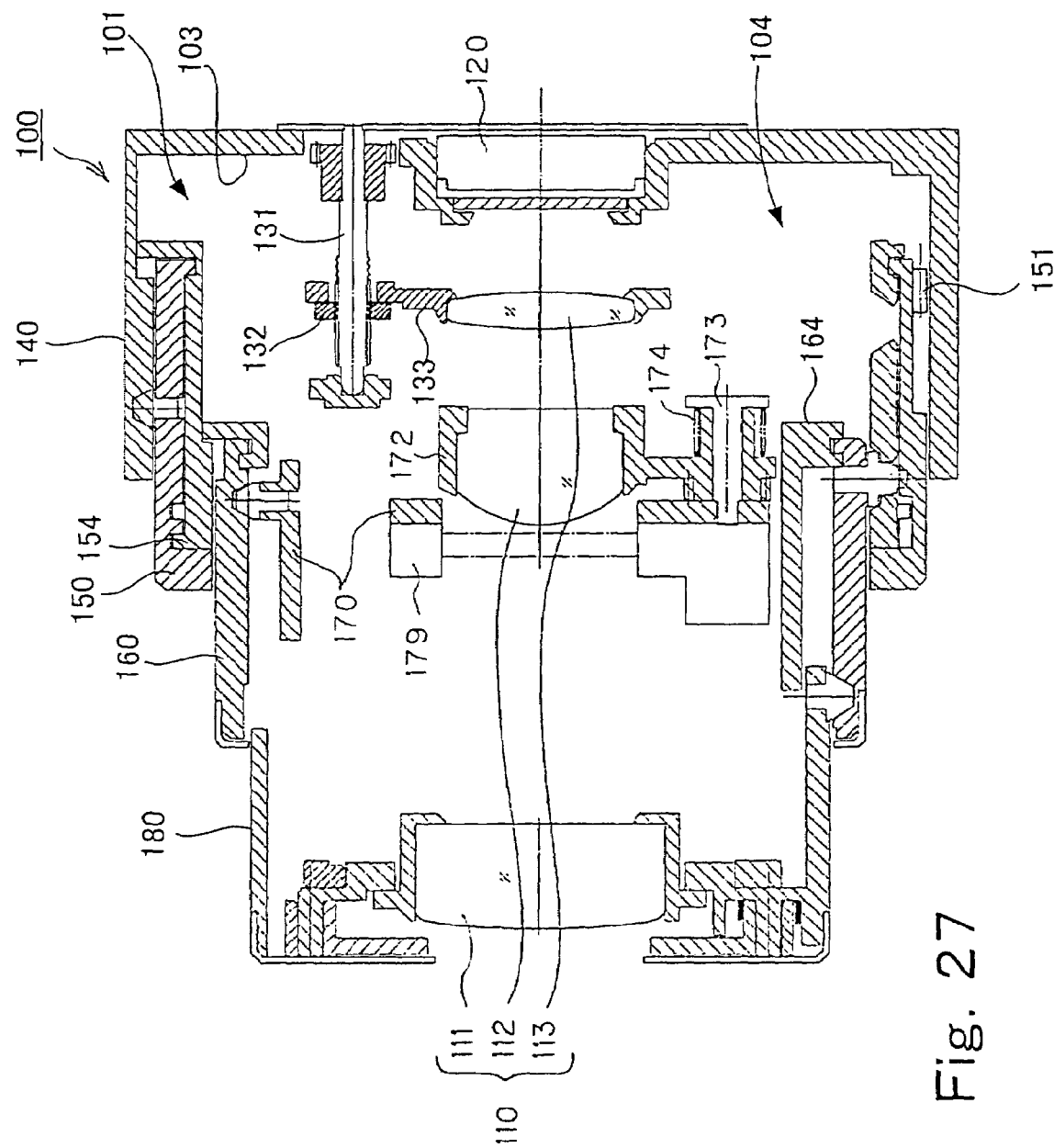
FIG. 27 is a sectional view showing a state of a wide-edge where the focal length is shortest, taken along the same line as FIG. 26.
Figure 28:
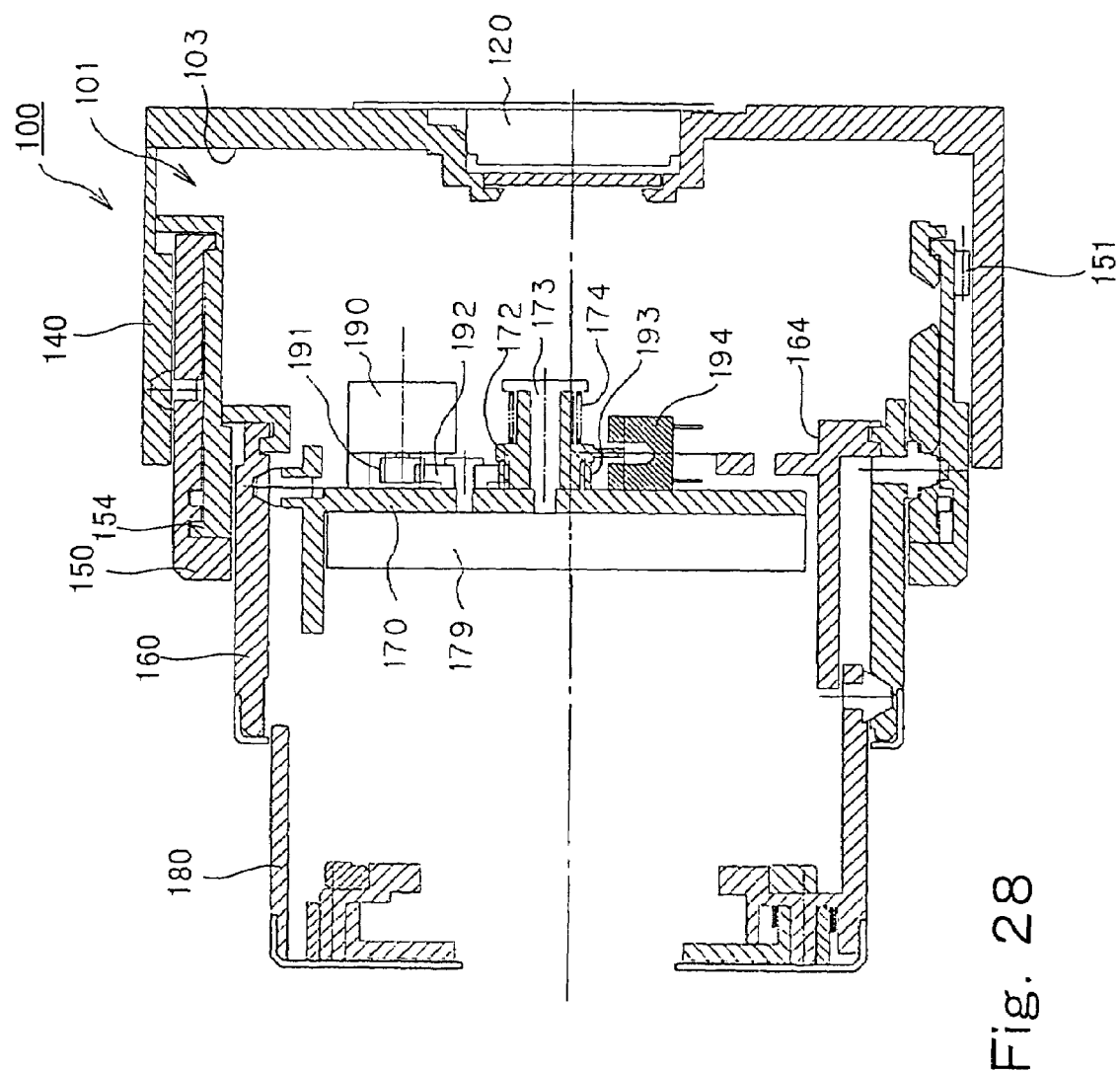
FIG. 28 is a sectional view showing main parts in a state of the wide-edge, taken along the line D-D' in FIG. 25.
Figure 29:
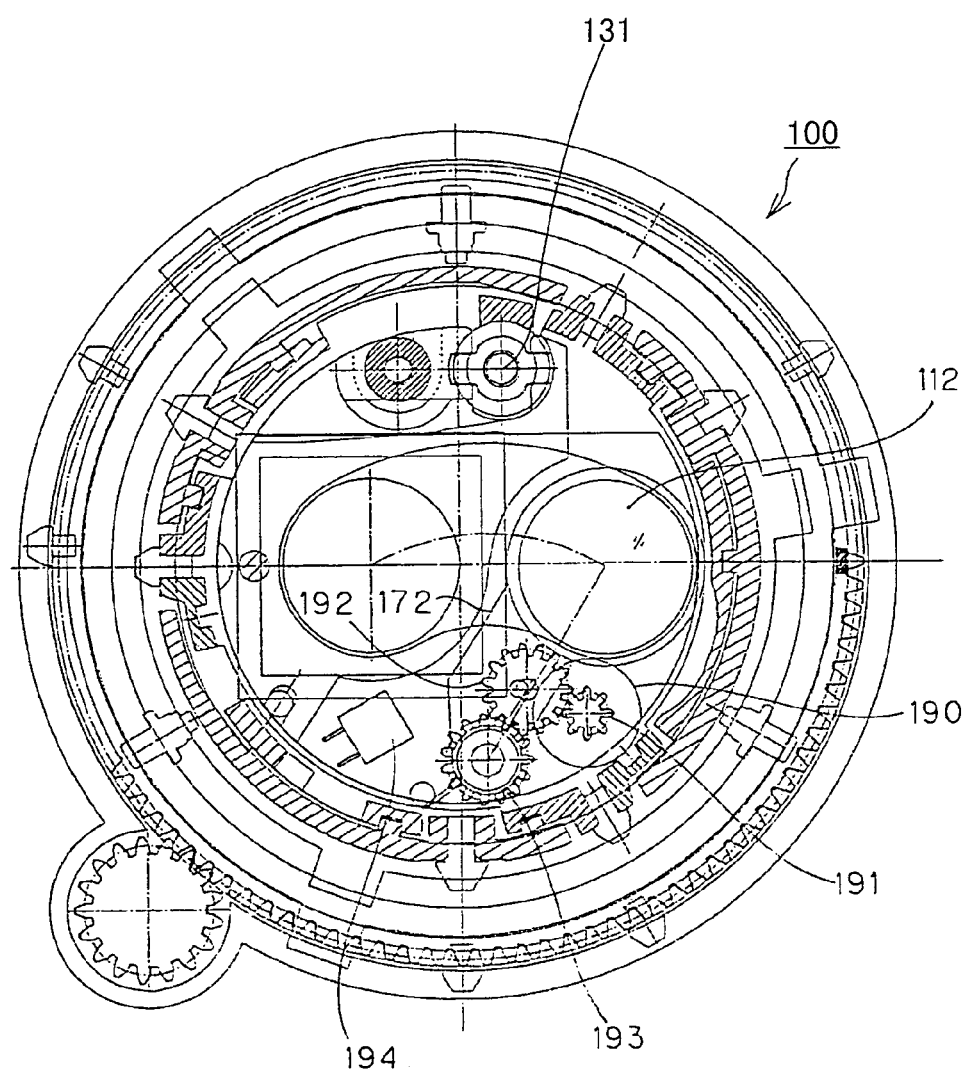
FIG. 29 is a typical illustration showing main parts of the digital camera of the third embodiment of the present invention, looking from an optical axis direction a lens barrel in a state of a collapse.
Figure 30:
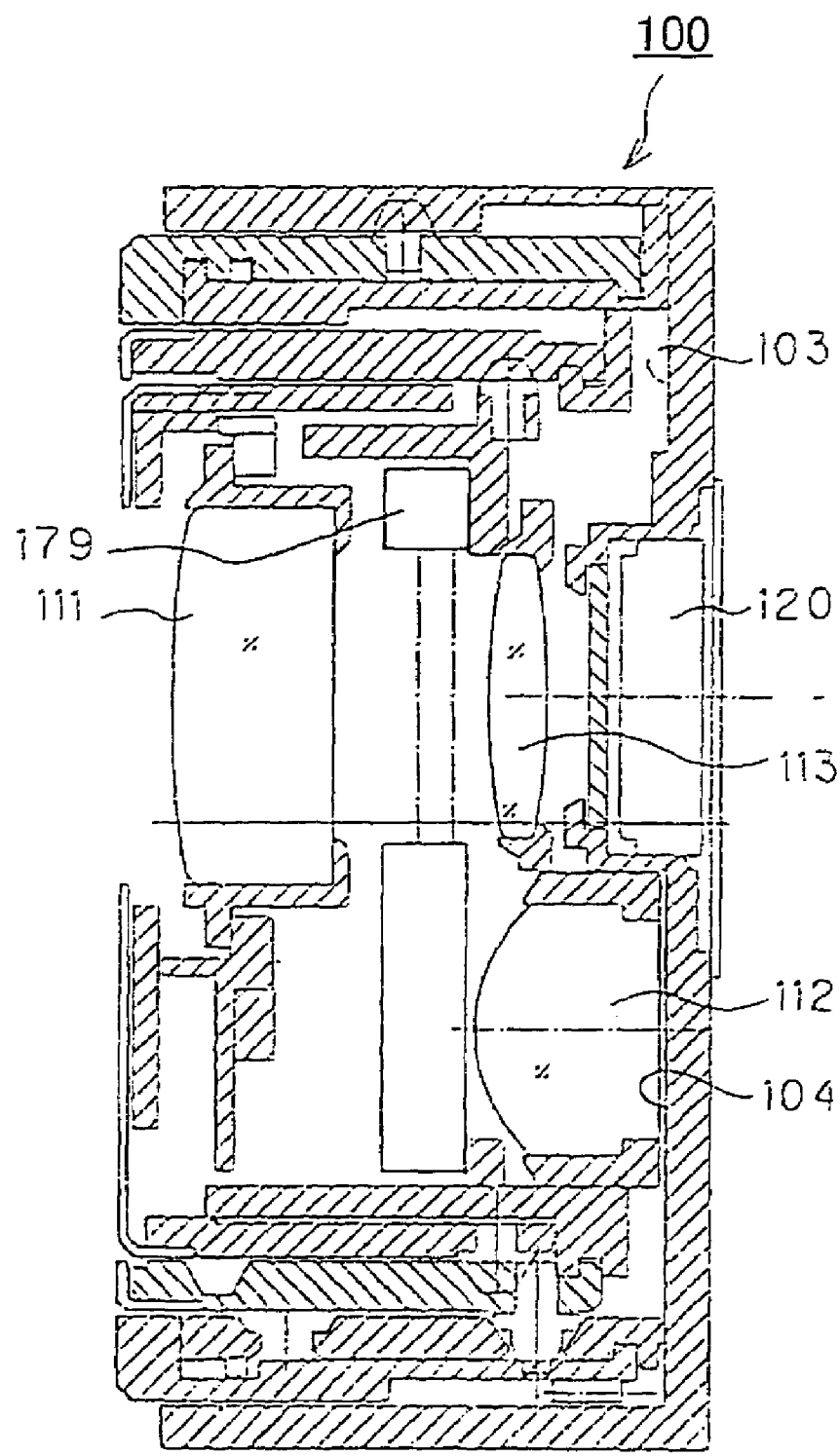
FIG. 30 is a sectional view taken along the same line as the line C-C' shown in FIG. 11 related to the first embodiment.
Figure 31:
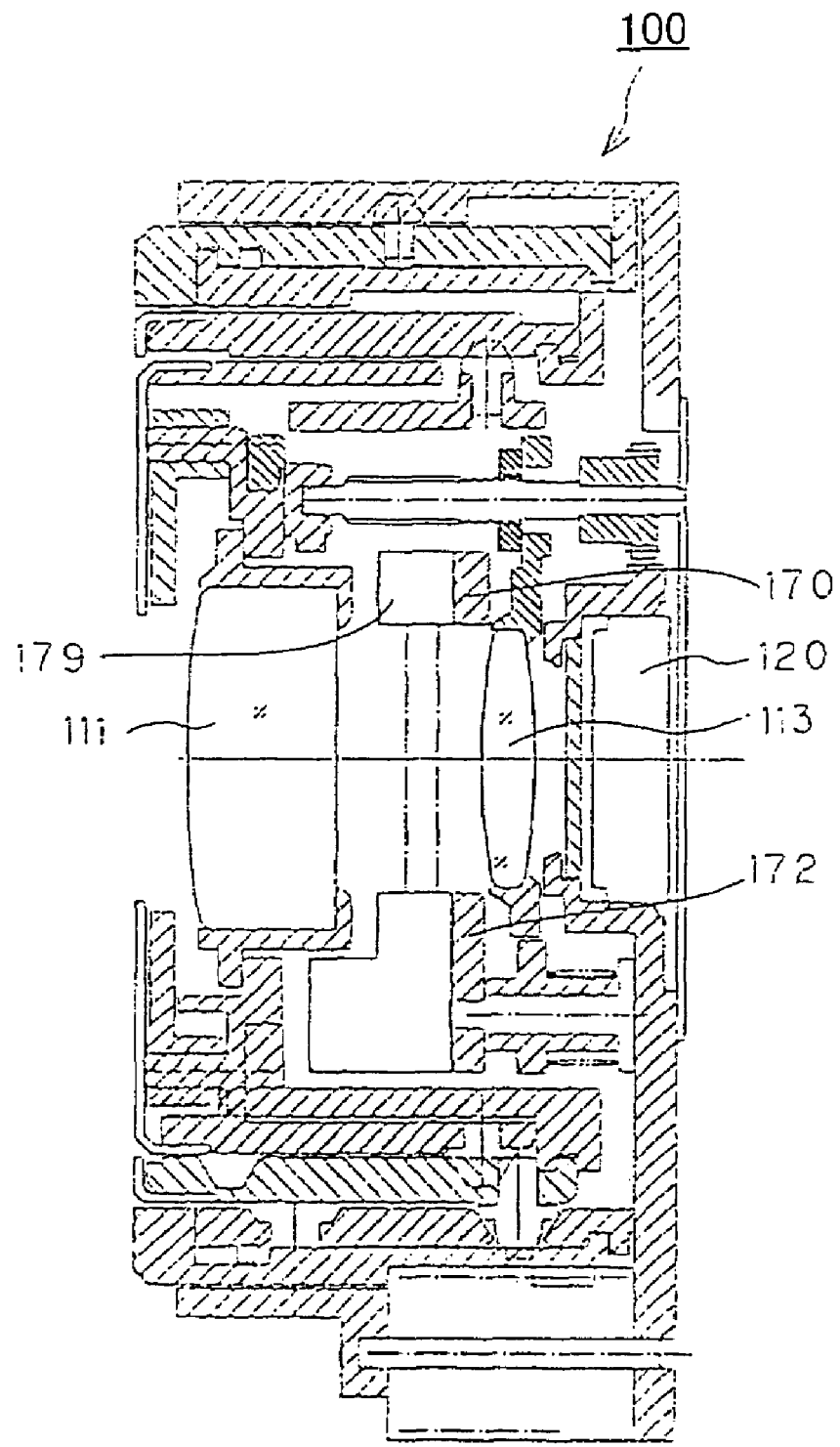
FIG. 31 is a sectional view taken along the same line as the line B-B' shown in FIG. 11 related to the first embodiment.

FIG. 24 is a typical illustration showing main parts of the digital camera of a third embodiment of the present invention, looking from an optical axis direction a lens barrel in a state of an extension. And FIG. 24 is a sectional view taken along the same line as the line F-F' in FIG. 7 related to the above-mentioned first embodiment associated with FIG. 26 which will be described later. FIG. 25 is a view showing the line D-D' on the same sectional view as FIG. 24. FIG. 26 is a sectional view showing a state of a tele-edge where the focal length is longest, taken along the same line as the line A-A' in FIG. 4 related to the first embodiment associated with FIG. 24. FIG. 27 is a sectional view showing a state of a wide-edge where the focal length is shortest, taken along the same line as FIG. 26. FIG. 28 is a sectional view showing main parts in a state of the wide-edge, taken along the line D-D' in FIG. 25. FIG. 29 is a typical illustration showing main parts of the digital camera of the third embodiment of the present invention as shown in FIG. 24 to FIG. 28, looking from an optical axis direction a lens barrel in a state of a collapse. And FIG. 29 is a sectional view taken along the same line as the line E-E' shown in FIG. 13 related to the above-mentioned first embodiment associated with FIG. 30 which will be described later. FIG. 30 is a sectional view taken along the same line as the line C-C' shown in FIG. 11 related to the first embodiment. FIG. 31 is a sectional view taken along the same line as the line B-B' shown in FIG. 11 related to the first embodiment.

In case of the third embodiment, as will be seen from FIG. 20, which corresponds to FIG. 9 related to the first embodiment, and from FIG. 28, which corresponds to FIG. 20 related to the second embodiment, there is provided no convex portion 205, which projects from the wall member 103, and there is provided no convex portion 160a, which projects to the rear end of the intermediate cylinder 160, and further there is provided no lever member 175 which engages with the convex portion.

Instead, the digital camera according to the third embodiment is provided with a stepping motor 190, a driving gear 191 for transmitting a rotary driving force of the stepping motor 190 to the rear elements holding frame 172, the driving gear 191 being fixed on a rotary shaft of the stepping motor 190, a transmission gear 192 for transmitting the driving force, a receiving gear 193 fixed on the rear elements holding frame 172, and a photo-interrupter 194 for detecting that the rear elements holding frame 172 is on the optical axis.

The rear elements lens 112 revolves between a position on the optical axis and the saving position when the rotary driving force of the stepping motor 190 is transmitted via the driving gear 191, the transmission gear 192 and the receiving gear 193 to the rear elements holding frame 172, so that the rear elements holding frame 172 rotatably moves around the rotary shaft 173. Also in the third embodiment, as shown in FIG. 28, there is provided the coil spring 174 around the rotary shaft 173, so that the rear elements lens 112 may stably stop at the position on the optical axis by the enabling force of the coil spring 174.

As in the third embodiment, it is acceptable that there is provided an additional driving source for revolving the rear elements lens 112 by means of rotatably moving the rear elements holding frame 172, separately from the driving source for collapse and extension of the lens barrel. Also in the third embodiment, in a similar fashion to that of the first embodiment and the second embodiment, it is possible to remove the rear elements lens 112 from the optical axis and to save the same to the hollow portion 104.

Figure 32:
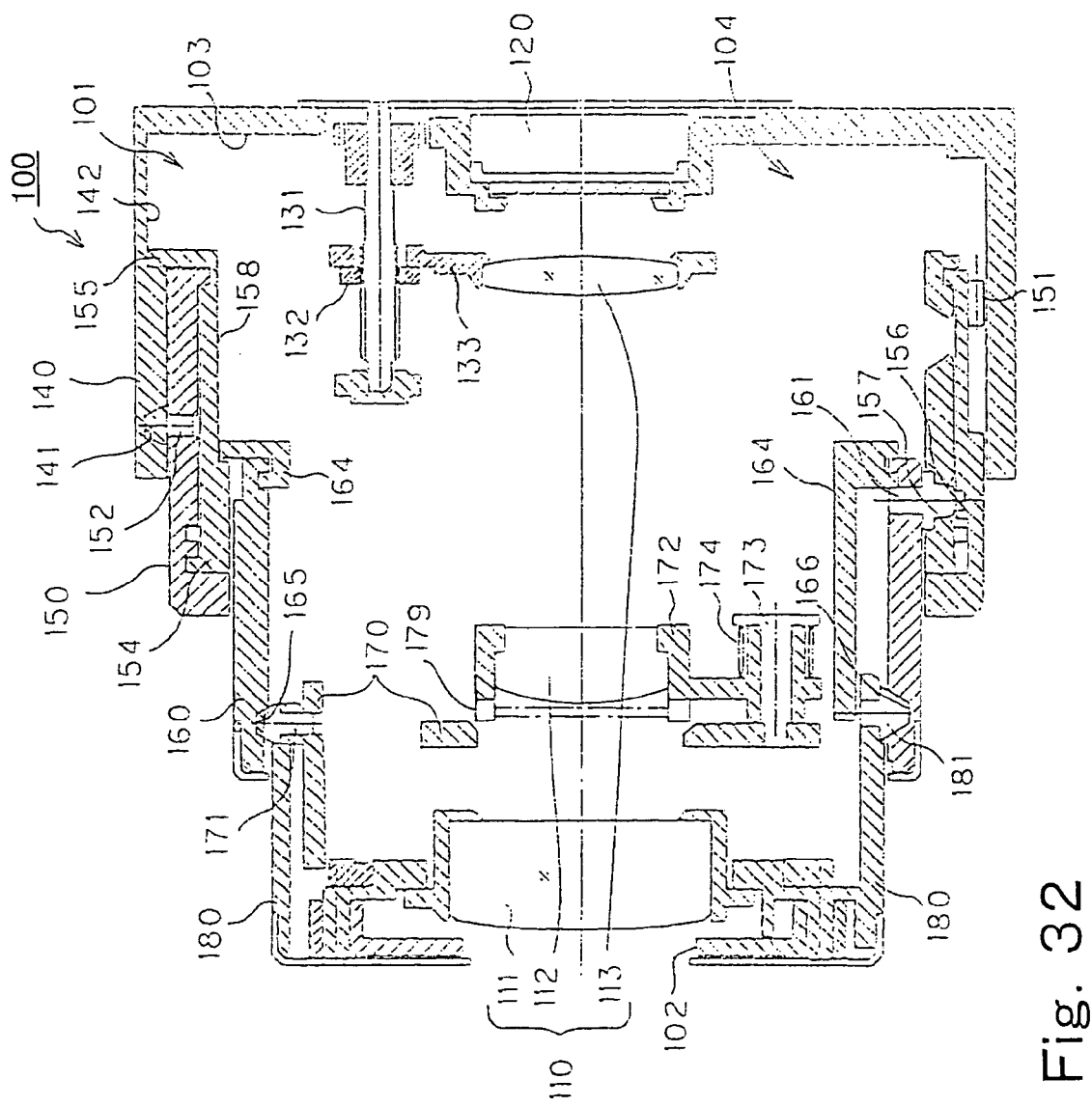
FIG. 32 is a sectional view showing a state of a tele-edge where the focal length is longest, of a digital camera of the fourth embodiment.
Figure 33:
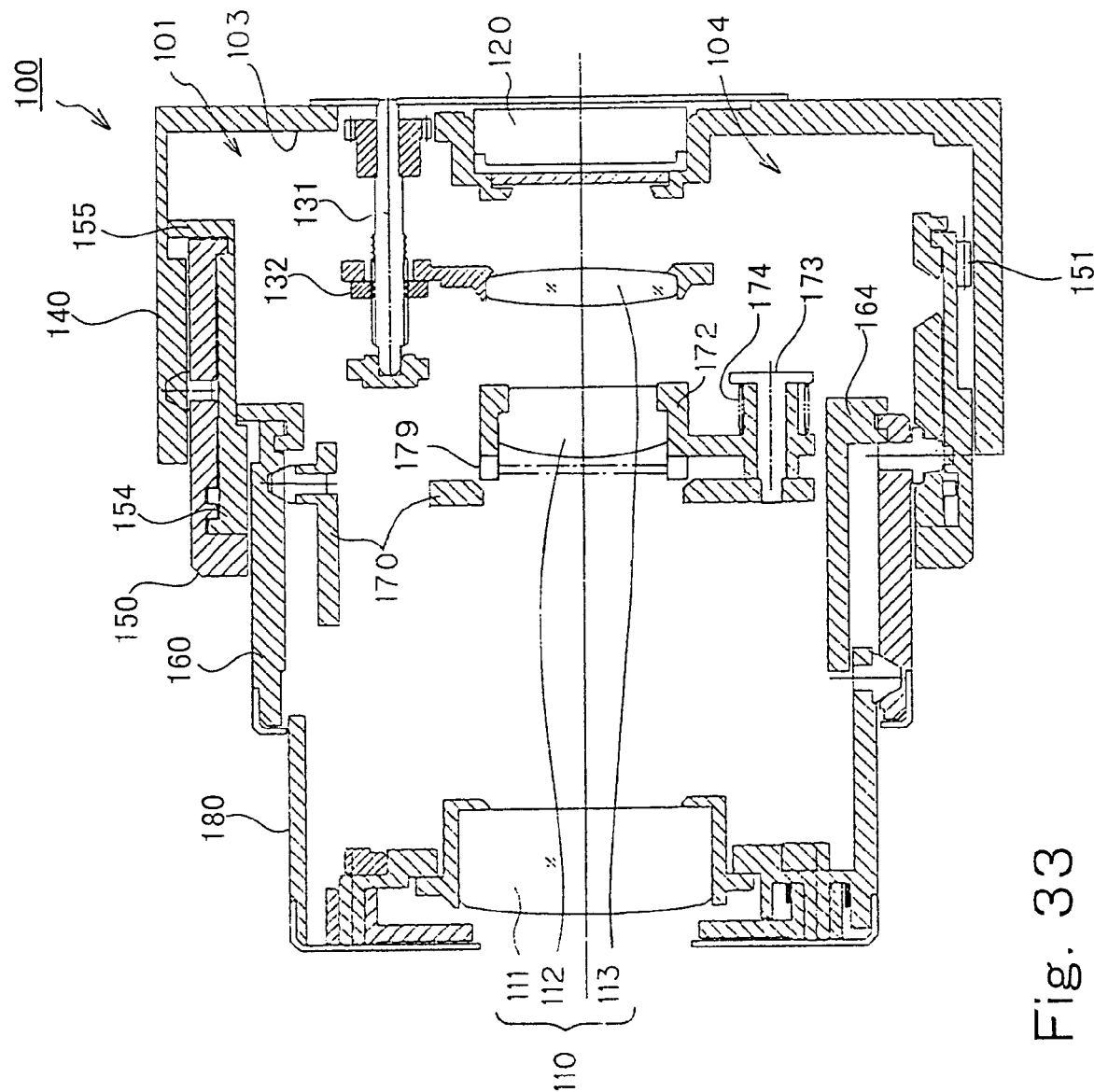
FIG. 33 is a sectional view showing a state of a wide-edge where the focal length is shortest, of the digital camera of the fourth embodiment.
Figure 34:
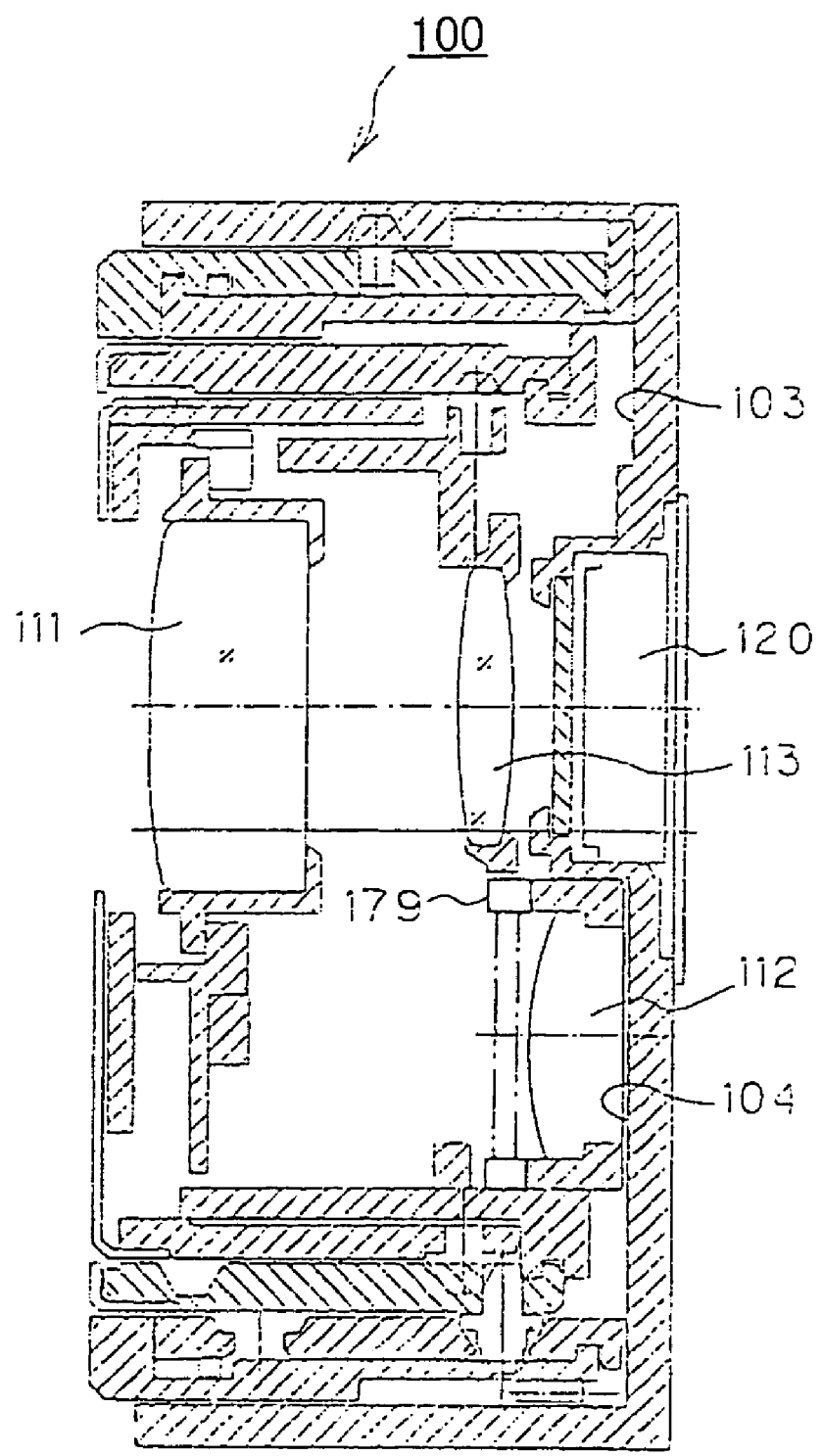
FIG. 34 is a sectional view showing a collapsed state of the digital camera of the fourth embodiment, taken along an optical axis.

FIG. 32 is a sectional view showing a state of a tele-edge where the focal length is longest, of a digital camera of the fourth embodiment. FIG. 33 is a sectional view showing a state of a wide-edge where the focal length is shortest, of the digital camera of the fourth embodiment. FIG. 34 is a sectional view showing a collapsed state of the digital camera of the fourth embodiment, taken along an optical axis.

FIG. 32, FIG. 33 and FIG. 34 correspond to FIG. 6, FIG. 8 and FIG. 12, respectively, which relate to the first embodiment. A different point from the first embodiment is follows. According to the first embodiment, the shutter unit 179 is fixed on the rear elements guide frame 170. On the other hand, according to the fourth embodiment, the shutter unit 179 is fixed on the rear elements holding frame 172. The shutter unit 179 is disposed in front of the rear elements lens 112. The shutter unit 179 is concerned with a system in which a light quantity is controlled using an electrooptical element such as a liquid crystal and a PLZT (a polarizing plate). The shutter unit 179 incorporates thereinto an aperture for controlling a light quantity passing through the aperture by controlling the aperture caliber and a shutter for controlling a light quantity passing through the shutter by controlling the shutter time.

The shutter unit 179 is fixed on the rear elements holding frame 172 for holding the rear elements lens 112. And thus at the time of the collapse, as shown in FIG. 34, the shutter unit 179 saves to the hollow portion 104 together with the rear elements lens 112, and at the time of the extension, as shown in FIG. 32 and FIG. 33, the shutter unit 179 advances on the optical axis together with the rear elements lens 112.

The mechanism for the save and advance involved in the collapse and extension is the same as that of the first embodiment, and thus redundant explanation will be omitted.

Figure 35:
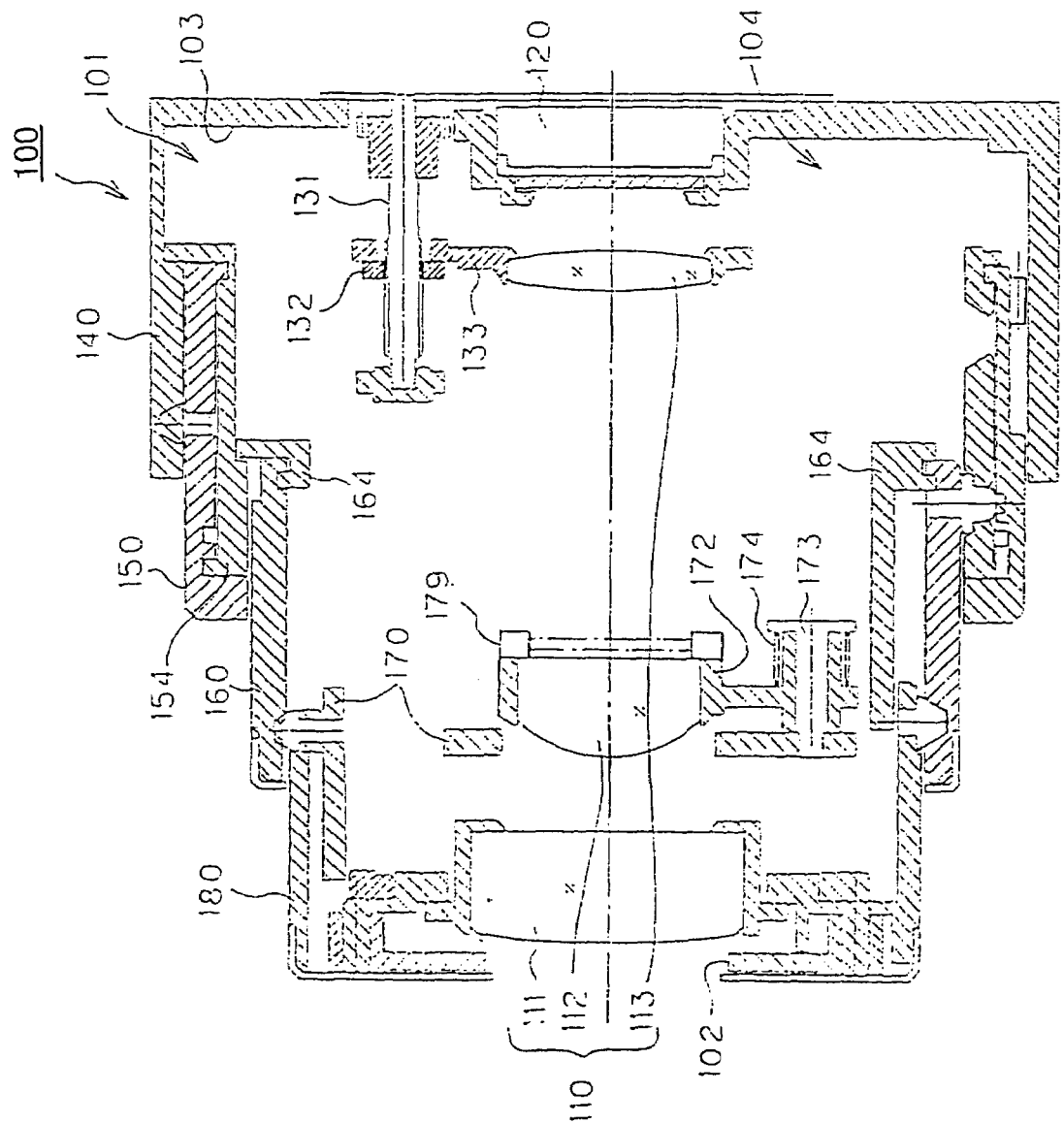
FIG. 35 is a sectional view showing a state of a tele-edge where the focal length is longest, of a digital camera of the fifth embodiment.
Figure 36:
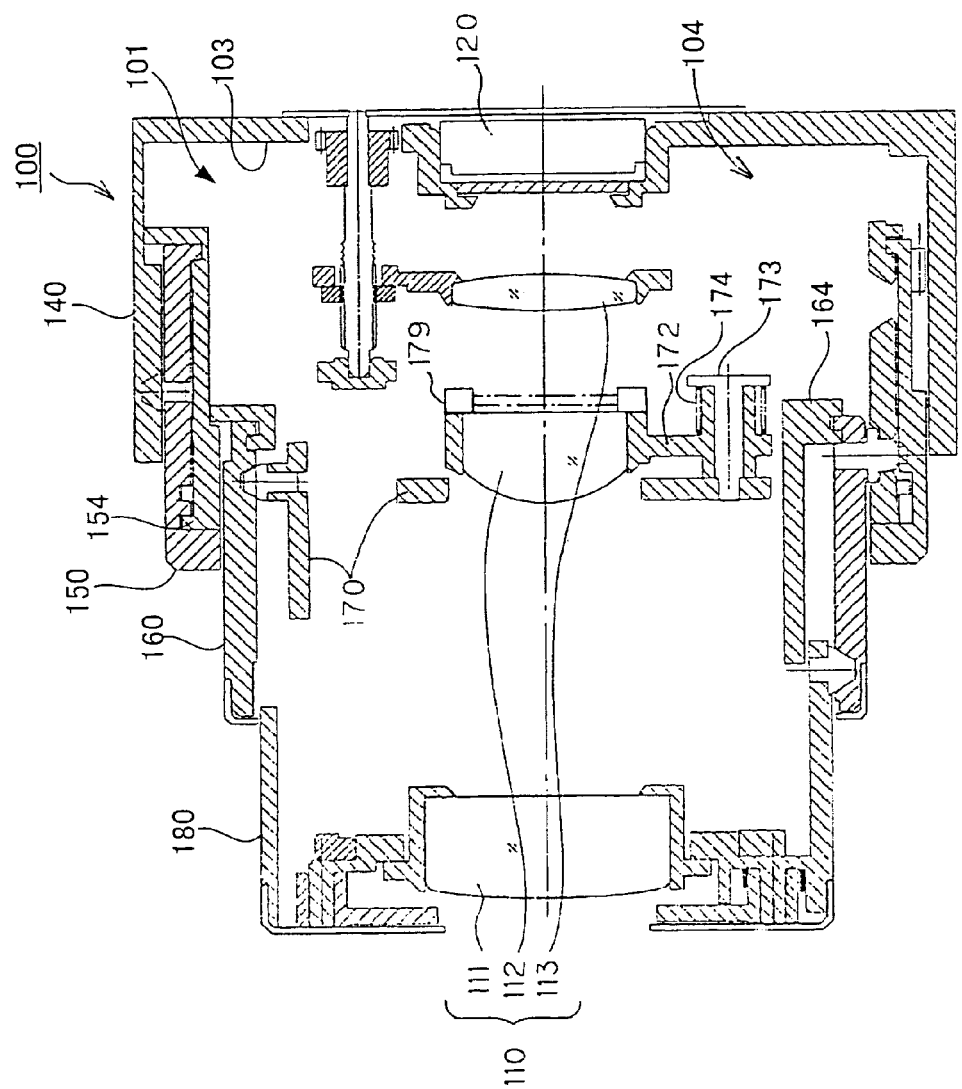
FIG. 36 is a sectional view showing a state of a wide-edge where the focal length is shortest, of the digital camera of the fifth embodiment.
Figure 37:
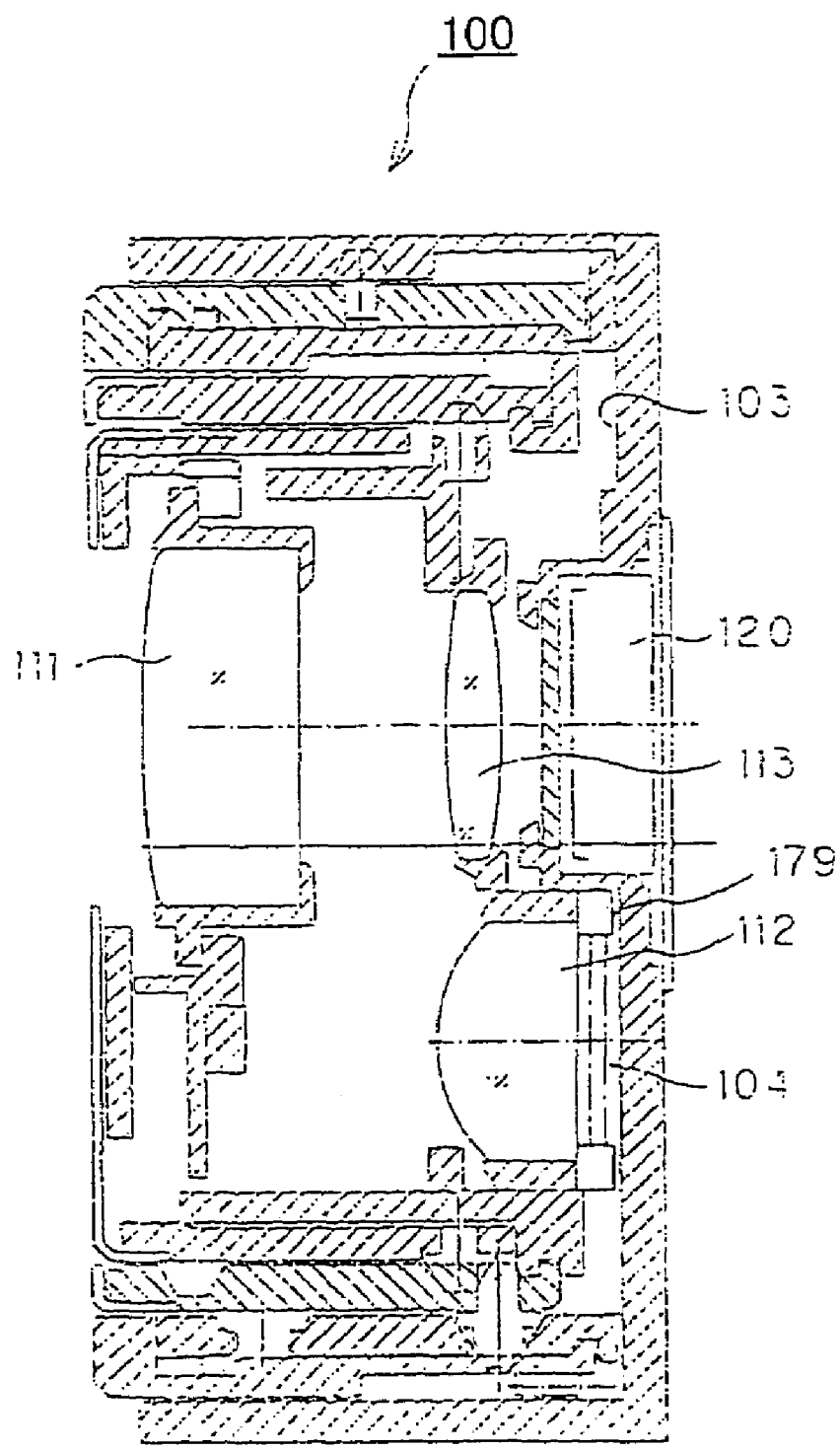
FIG. 37 is a sectional view showing a collapsed state of the digital camera of the fifth embodiment, taken along an optical axis.

FIG. 35 is a sectional view showing a state of a tele-edge where the focal length is longest, of a digital camera of the fifth embodiment. FIG. 36 is a sectional view showing a state of a wide-edge where the focal length is shortest, of the digital camera of the fifth embodiment. FIG. 37 is a sectional view showing a collapsed state of the digital camera of the fifth embodiment, taken along an optical axis.

FIG. 35, FIG. 36 and FIG. 37 correspond to FIG. 18, FIG. 19 and FIG. 22, respectively, which relate to the second embodiment. A different point from the second embodiment is follows. According to the second embodiment, in a similar fashion to that of the first embodiment, the shutter unit 179 is fixed on the rear elements guide frame 170. On the other hand, according to the fifth embodiment, the shutter unit 179 is disposed backward in the optical axis direction of the rear elements lens 112 and is fixed on the rear elements holding frame 172. The shutter unit 179 is concerned with a system in which a light quantity is controlled using an electrooptical element such as a liquid crystal and a PLZT (a polarizing plate), in a similar fashion to that of the forth embodiment. The shutter unit 179 incorporates thereinto an aperture for controlling a light quantity passing through the aperture by controlling the aperture caliber and a shutter for controlling a light quantity passing through the shutter by controlling the shutter time.

The shutter unit 179 is fixed on the rear elements holding frame 172 for holding the rear elements lens 112. And thus at the time of the collapse, as shown in FIG. 37, the shutter unit 179 saves to the hollow portion 104 together with the rear elements lens 112, and at the time of the extension, as shown in FIG. 35 and FIG. 36, the shutter unit 179 advances on the optical axis together with the rear elements lens 112.

The mechanism for the save and advance involved in the collapse and extension is the same as that of the second embodiment, and thus redundant explanation will be omitted.

In the manner as mentioned above, according to the present invention, it is acceptable that the shutter unit is saved and advanced together with the rear elements lens in accordance with the collapse and extension.

Incidentally, according to the fourth embodiment and the fifth embodiment, as the shutter unit 179, there is used an electrooptical element such as a liquid crystal and a PLZT (a polarizing plate). However, there is no need that the shutter unit, which is saved together with the rear elements lens, is not always one using the electrooptical element, and it is acceptable to adopt a mechanical shutter for mechanically controlling an aperture caliber and a shutter speed or an iris shutter unit in which a predetermined aperture of iris is saved and advanced on the optical axis.

Further, according to the present embodiments, there are provided both the aperture and the shutter. However, it is acceptable that there is provided a unit used both as the aperture and the shutter. In this respect, also in case of the shutter unit using the electrooptical element, it is acceptable that there is provided a unit used both as the aperture and the shutter, using the electrooptical element.

According to the first embodiment to the third embodiment, the shutter unit 179 remains on the optical axis without saving at the time of the collapse. While the explanation of the first embodiment to the third embodiment is silent on the structure of the shutter unit 179, also in case of the shutter unit remaining on the optical axis at the time of the collapse, it is acceptable to adopt the shutter unit using the electrooptical element, a mechanical shutter or an iris shutter unit. Further, according to the first, second and third embodiments, as the image taking lens, by way of example, there is raised such a type of image taking lens, which is variable in a focal length, comprising three groups of a front elements lens, a rear elements lens, and a focus lens in the named order with respect to the optical axis direction, wherein the focusing is performed by a movement of the focus lens at the rear end with respect to the optical axis direction. However, the present invention is not restricted to these embodiments in which the focus lens is located at the rear end with respect to the optical axis direction. And the present invention is widely applicable to a digital camera having such a type of image taking lens, which is variable in a focal length, comprising a first lens group, a second lens group, and a third lens group, which are arranged on the optical axis, wherein the focusing is performed by a movement of the focus lens.

While the respective embodiments as mentioned above are explained taking into consideration a digital camera for a still picture photography of the digital cameras, the present invention is applicable to a digital camera for a dynamic picture photography or a digital camera for both the still picture photography and the dynamic picture photography.

As mentioned above, according to the present invention, it is possible to contribute to implementing further thinness of the lens structure as compared with the conventional ones.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A digital camera that creates an image signal through catching a subject light, the digital camera comprising:
    an image taking lens, which is variable in a focal length, comprising three groups of a first lens group, a second lens group, and a third lens group in the named order with respect to an optical axis direction;
    a lens barrel that incorporates therein the image taking lens, having in front an aperture through which the image taking lens appears and having in rear an internal space defined by a wall, the lens barrel being free in extension and collapse and performing a focal length control; and
    a solid state imaging device that receives the subject light formed by the image taking lens to create the image signal, the solid state imaging device being supported by the wall,
    wherein the lens barrel has a second lens group guide frame that moves in the optical axis direction in accordance with the extension and the collapse so as to determine a position related to the optical axis direction of the second lens group, and a second lens group holding frame that holds the second lens group and is pivotally supported by the second lens group guide frame, the second lens group holding frame causing the second lens group to revolve on the optical axis of the image taking lens at the time of the extension, and the second lens group holding frame causing the second lens group to revolve on a saving position out of the optical axis of the image taking lens at the time of the collapse;
    wherein the second lens group holding frame is enabled in a direction that the second lens group is revolved on the optical axis,
    the lens barrel has a cylinder that rotatably moves in accordance with the extension and the collapse, and the cylinder has a revolving affecting section being in contact with the second lens group holding frame by a rotatable movement of the cylinder at the time of the collapse to affect revolving of the second lens group holding frame, and
    the second lens group holding frame has an affect receiving section that is pushed by the revolving affecting section at the time of the collapse so that the second lens group revolves into the saving position.

2. A digital camera according to claim 1, wherein the second lens group holding frame causes the second lens group to advance onto the optical axis of the image taking lens, at the time of the extension, in such a manner that the second lens group holding frame is released from urging of the revolving affecting section.

3. A digital camera according to claim 1, wherein the revolving affecting section has a projection provided at the rear end of the cylinder with respect to the optical axis direction, and
    the affect receiving section causes the second lens group to be saved from the optical axis of the image taking lens to the saving position through revolving by means of pushing by a taper of the revolving affecting section, at the time of the collapse.

4. A digital camera according to claim 1, wherein the cylinder comprises a cam groove for guiding the second lens group guide frame.

5. A digital camera according to claim 4, wherein the cam groove is formed on an inner wall of the cylinder.

6. A digital camera according to claim 4, wherein the cam groove is engaged with a cam pin fixed on the second lens group guide frame.

7. A digital camera according to claim 1, wherein the revolving affecting section comprises a convex portion on a rear edge of the cylinder.

8. A digital camera according to claim 7, wherein the affect receiving section comprises a lever member pivotally supported by a rotary shaft so as to be rotatably movable with respect to the second lens group guide frame.

9. A digital camera according to claim 8, wherein at the time of the collapse a sidewall of the convex portion of the cylinder hits an edge of the lever member, so that the lever member rotatably moves the second lens group into the saving position.

10. A digital camera that creates an image signal through catching a subject light, the digital camera comprising:
   an image taking lens, which is variable in a focal length, comprising three groups of a front elements lens, a rear elements lens, and a focus lens in the named order with respect to an optical axis direction, wherein a focusing is performed by a movement of the focus lens;
   a lens barrel that incorporates therein the image taking lens, having in front an aperture through which the image taking lens appears and having in rear an internal space defined by a wall, the lens barrel being free in extension and collapse and performing a focal length control; and
   a solid state imaging device that receives the subject light formed by the image taking lens to create the image signal, the solid state imaging device being disposed at a position projecting from the wall to the internal space and being supported by the wall,
   wherein the lens barrel has a lens advancing and saving mechanism in which at the time of the collapse of the lens barrel, the rear elements lens is saved to a hollow portion divided by the solid state imaging device and the wall beside the solid state imaging device, the hollow portion being formed by the fact that the solid state imaging device is disposed at the position projecting from the wall, and at the time of the extension of the lens barrel, the rear elements lens is advanced onto an optical axis of the image taking lens;
   wherein the lens barrel has a rear elements guide frame that moves in the optical axis direction in accordance with the extension, the collapse and the focal length control so as to determine a position related to the optical axis direction of the rear elements lens, and a rear elements holding frame that holds the rear elements lens and is pivotally supported by the rear elements guide frame, the rear elements holding frame causing the rear elements lens to revolve on the optical axis of the image taking lens at the time of the extension, and the rear elements holding frame causing the rear elements lens to revolve on the hollow portion at the time of the collapse;
   wherein the rear elements holding frame is enabled in a direction that the rear elements lens is revolved on the optical axis,
   the lens barrel has a cylinder that rotatably moves in accordance with the extension, the collapse and the focal length control, and the cylinder has a revolving affecting section being in contact with the rear elements holding frame by a rotatable movement of the cylinder at the time of the collapse to affect revolving of the rear elements holding frame, and
   the rear elements holding frame has an affect receiving section that is pushed by the revolving affecting section at the time of the collapse so that the rear elements lens revolves into the hollow portion.

11. A digital camera according to claim 10, wherein the digital camera further comprises a light quantity control member that moves in one united body together with the rear elements lens in the optical axis direction of the image taking lens stored in the lens barrel to control a light quantity of the subject light passing through the image taking lens, and
   the lens advancing and saving mechanism provides such a performance that at the time of the collapse of the lens barrel, the light quantity control member is saved together with the rear elements lens to the hollow portion, and at the time of the extension of the lens barrel, the light quantity control member is advanced together with the rear elements lens onto the optical axis of the image taking lens.

12. A digital camera that creates an image signal through catching a subject light, the digital camera comprising:
   an image taking lens, which is variable in a focal length, comprising three groups of a front elements lens, a rear elements lens, and a focus lens in the named order with respect to an optical axis direction, wherein a focusing is performed by a movement of the focus lens;
   a lens barrel that incorporates therein the image taking lens, having in front an aperture through which the image taking lens appears and having in rear an internal space defined by a wall, the lens barrel being free in extension and collapse and performing a focal length control; and
   a solid state imaging device that receives the subject light formed by the image taking lens to create the image signal, the solid state imaging device being disposed at a position projecting from the wall to the internal space and being supported by the wall,
   wherein the lens barrel has a lens advancing and saving mechanism in which at the time of the collapse of the lens barrel, the rear elements lens is saved to a hollow portion divided by the solid state imaging device and the wall beside the solid state imaging device, the hollow portion being formed by the fact that the solid state imaging device is disposed at the position projecting from the wall, and at the time of the extension of the lens barrel, the rear elements lens is advanced onto an optical axis of the image taking lens;
   wherein the lens barrel has a rear elements guide frame that moves in the optical axis direction in accordance with the extension, the collapse and the focal length control so as to determine a position related to the optical axis direction of the rear elements lens, and a rear elements holding frame that holds the rear elements lens and is pivotally supported by the rear elements guide frame, the rear elements holding frame causing the rear elements lens to revolve on the optical axis of the image taking lens at the time of the extension, and the rear elements holding frame causing the rear elements lens to revolve on the hollow portion at the time of the collapse; and
   wherein the digital camera further comprises:
      a driving source that rotatably moves the rear elements holding frame so that the rear elements lens revolves;
      a driving gear fixed on a rotary shaft of the driving source;
      a transmission gear connected to the driving gear; and
      a receiving gear fixed on the rear elements holding frame and connected to the transmission gear,
      wherein a rotary driving force of the driving source is transmitted via the driving gear, the transmission gear and the receiving gear to the rear elements holding frame.

13. A digital camera that creates an image signal through catching a subject light, the digital camera comprising:
   an image taking lens, which is variable in a focal length, comprising three groups of a front elements lens, a rear elements lens, and a focus lens in the named order with respect to an optical axis direction, wherein a focusing is performed by a movement of the focus lens;
   a lens barrel that incorporates therein the image taking lens, having in front an aperture through which the image taking lens appears and having in rear an internal space defined by a wall, the lens barrel being free in extension and collapse and performing a focal length control; and a solid state imaging device that receives the subject light formed by the image taking lens to create the image signal, the solid state imaging device being supported by the wall, wherein the lens barrel has a rear elements guide frame that moves in the optical axis direction in accordance with the extension, the collapse and the focal length control so as to determine a position related to the optical axis direction of the rear elements lens, and a rear elements holding frame that holds the rear elements lens and is pivotally supported by the rear elements guide frame, the rear elements holding frame causing the rear elements lens to revolve on the optical axis of the image taking lens at the time of the extension, and the rear elements holding frame causing the rear elements lens to revolve on a saving position out of the optical axis of the image taking lens at the time of the collapse;

wherein the rear elements holding frame is enabled in a direction that the rear elements lens is revolved on the optical axis, the lens barrel has a cylinder that rotatably moves in accordance with the extension, the collapse and the focal length control, and the cylinder has a revolving affecting section being in contact with the rear elements holding frame by a rotatable movement of the cylinder at the time of the collapse to affect revolving of the rear elements holding frame, and the rear elements holding frame has an affect receiving section that is pushed by the revolving affecting section at the time of the collapse so that the rear elements lens revolves into the hollow portion.

14. A digital camera that creates an image signal through catching a subject light, the digital camera comprising:

an image taking lens, which is variable in a focal length, comprising three groups of a front elements lens, a rear elements lens, and a focus lens in the named order with respect to an optical axis direction, wherein a focusing is performed by a movement of the focus lens;

a lens barrel that incorporates therein the image taking lens, having in front an aperture through which the image taking lens appears and having in rear an internal space defined by a wall, the lens barrel being free in extension and collapse and performing a focal length control; and a solid state imaging device that receives the subject light formed by the image taking lens to create the image signal, the solid state imaging device being supported by the wall, wherein the lens barrel has a rear elements guide frame that moves in the optical axis direction in accordance with the extension, the collapse and the focal length control so as to determine a position related to the optical axis direction of the rear elements lens, and a rear elements holding frame that holds the rear elements lens and is pivotally supported by the rear elements guide frame, the rear elements holding frame causing the rear elements lens to revolve on the optical axis of the image taking lens at the time of the extension, and the rear elements holding frame causing the rear elements lens to revolve on a saving position out of the optical axis of the image taking lens at the time of the collapse wherein the digital camera further comprises:

a driving source that rotatably moves the rear elements holding frame so that the rear elements lens revolves;

a driving gear fixed on a rotary shaft of the driving source;

a transmission gear connected to the driving gear; and a receiving gear fixed on the rear elements holding frame and connected to the transmission gear, wherein a rotary driving force of the driving source is transmitted via the driving gear, the transmission gear and the receiving gear to the rear elements holding frame.

15. A digital camera that creates an image signal through catching a subject light, the digital camera comprising:

a lens barrel that incorporates therein an image taking lens, which is variable in a focal length, comprising three groups of a first lens group, a second lens group, and a third lens group in the named order with respect to an optical axis direction, the lens barrel being free in extension and collapse and performing a focal length control, wherein the lens barrel has:

a cylinder that rotatably moves in accordance with the extension and the collapse;

a second lens group guide frame that moves in the optical axis direction in accordance with the extension and the collapse so as to determine a position related to the optical axis direction of the second lens group; and a second lens group holding frame that holds the second lens group and is pivotally supported by the second lens group guide frame, the second lens group holding frame causing the second lens group to advance onto the optical axis of the image taking lens at the time of the extension, and the second lens group holding frame causing the second lens group to be saved to a saving position out of the optical axis of the image taking lens at the time of the collapse, wherein the cylinder has a revolving affecting section being in contact with the second lens group guide frame by a rotatable movement of the cylinder at the time of the collapse to affect revolving of the second lens group holding frame, and wherein the second lens group holding frame has an affect receiving section that is affected by the revolving affecting section at the time of the collapse so that the second lens group revolves into the saving position.

16. A digital camera according to claim 15, wherein the digital camera further comprises a driving source that rotatably moves the second lens group holding frame so that the second lens group revolves.

17. A digital camera according to claim 16, wherein the driving source is a motor, and the second lens group holding frame has a gear for transmitting a driving force from the motor.

18. A digital camera according to claim 15, wherein the second lens group holding frame causes the second lens group to advance onto the optical axis of the image taking lens, at the time of the extension, in such a manner that the second lens group holding frame is released from affection of the revolving affecting section.

19. A digital camera according to claim 18, wherein the revolving affecting section is a projection provided at the rear end of the cylinder with respect to the optical axis direction, wherein the affect receiving section causes the second lens group to be saved from the optical axis of the image taking lens to the saving position through revolving by means of pushing by a side of the projection that rotatably moves, at the time of the collapse.

20. A digital camera according to claim 15, wherein the digital camera further comprises a light quantity control member that moves in one united body together with the second lens group in the optical axis direction of the image taking lens to control a light quantity of the subject light passing through the image taking lens, and wherein the light quantity control member is advanced onto the optical axis of the image taking lens at the time of the extension and the light quantity control member is saved to the saving position at the time of the collapse, together with the second lens group.

21. A digital camera that creates an image signal through catching a subject light, the digital camera comprising:
   a lens barrel that incorporates therein an image taking lens, which is variable in a focal length, comprising three groups of a first lens group, a second lens group, and a third lens group in the named order with respect to an optical axis direction, the lens barrel being free in extension and collapse and performing a focal length control, wherein the lens barrel has:
   a second lens group guide frame that moves in the optical axis direction in accordance with the extension and the collapse so as to determine a position related to the optical. axis direction of the second lens group; and
   a second lens group holding frame that holds the second lens group and is pivotally supported by the second lens group guide frame, the second lens group holding frame causing the second lens group to advance onto the optical axis of the image taking lens at the time of the extension, and the second lens group holding frame causing the second lens group to be saved to a saving position out of the optical axis of the image taking lens at the time of the collapse;
   a driving source that rotatably moves the second lens group holding frame so that the second lens group is advanced onto the optical axis of the image taking lens at the time of the extension and the second lens group is saved to a saving position at the time of the collapse;
   a driving gear fixed on a rotary shaft of the driving source;
   a transmission gear connected to the driving gear; and
   a receiving gear fixed on the second lens group holding frame and connected to the transmission gear,
   wherein a rotary driving force of the driving source is transmitted via the driving gear, the transmission gear and the receiving gear to the second lens group holding frame.

22. A digital camera according to claim 21, wherein the digital camera further comprises a light quantity control member that moves in one united body together with the second lens group in the optical axis direction of the image taking lens to control a light quantity of the subject light passing through the image taking lens, and wherein the light quantity control member is advanced onto the optical axis of the image taking lens at the time of the extension and the light quantity control member is saved to the saving position at the time of the collapse, together with the second lens group.

23. A lens barrel that incorporates therein an image taking lens, which is variable in a focal length, comprising three groups of a first lens group, a second lens group, and a third lens group in the named order with respect to an optical axis direction, the lens barrel being free in extension and collapse and performing a focal length control, the lens barrel comprising:
   a cylinder that rotatably moves in accordance with the extension and the collapse;
   a second lens group guide frame that moves in the optical axis direction in accordance with the extension and the collapse so as to determine a position related to the optical axis direction of the second lens group; and
   a second lens group holding frame that holds the second lens group and is pivotally supported by the second lens group guide frame, the second lens group holding frame causing the second lens group to advance onto the optical axis of the image taking lens at the time of the extension, and the second lens group holding frame causing the second lens group to be saved to a saving position out of the optical axis of the image taking lens at the time of the collapse,
   wherein the cylinder has a revolving affecting section being in contact with the second lens group guide frame by a rotatable movement of the cylinder at the time of the collapse to affect revolving of the second lens group holding frame, and
   wherein the second lens group holding frame has an affect receiving section that is affected by the revolving affecting section at the time of the collapse so that the second lens group revolves into the saving position.

24. A lens barrel according to claim 23, wherein the lens barrel further comprises a light quantity control member that moves in one united body together with the second lens group in the optical axis direction of the image taking lens to control a light quantity of the subject light passing through the image taking lens, and wherein the light quantity control member is advanced onto the optical axis of the image taking lens at the time of the extension and the light quantity control member is saved to the saving position at the time of the collapse, together with the second lens group.

25. A lens barrel according to claim 23, wherein the second lens group holding frame causes the second lens group to advance onto the optical axis of the image taking lens, at the time of the extension, in such a manner that the second lens group holding frame is released from affection of the revolving affecting section.

26. A lens barrel according to claim 25, wherein the revolving affecting section is a projection provided at the rear end of the cylinder with respect to the optical axis direction,
   wherein the affect receiving section causes the second lens group to be saved from the optical axis of the image taking lens to the saving position through revolving by means of pushing by a side of the projection that rotatably moves, at the time of the collapse.

27. A lens barrel that incorporates therein an image taking lens, which is variable in a focal length, comprising three groups of a first lens group, a second lens group, and a third lens group in the named order with respect to an optical axis direction, the lens barrel being free in extension arid collapse and performing a focal length control, the lens barrel comprising:
   a second lens group guide frame that moves in the optical axis direction in accordance with the extension and the collapse so as to determine a position related to the optical axis direction of the second lens group; and
   a second lens group holding frame that holds the second lens group and is pivotally supported by the second lens group guide frame, the second lens group holding frame causing the second lens group to advance onto the optical axis of the image taking lens at the time of the extension, and the second lens group holding frame causing the second lens group to be saved to a saving position out of the optical axis of the image taking lens at the time of the collapse; and
   a driving source that rotatably moves the second lens group holding frame so that the second lens group is advanced onto the optical axis of the image taking lens at the time of the extension and the second lens group is saved to a saving position at the time of the collapse;
   a driving gear fixed on a rotary shaft of the driving source;
   a transmission gear connected to the driving gear; and
   a receiving gear fixed on the second lens group holding frame and connected to the transmission gear, wherein a rotary driving force of the driving source is transmitted via the driving gear, the transmission gear and the receiving gear to the second lens group holding frame.

28. A lens barrel according to claim 27, wherein the lens barrel further comprises a light quantity control member that moves in one united body together with the second lens group in the optical axis direction of the image taking lens to control a light quantity of the subject light passing through the image taking lens, and wherein the light quantity control member is advanced onto the optical axis of the image taking lens at the time of the extension and the light quantity control member is saved to the saving position at the time of the collapse, together with the second lens group.

29. A digital camera according to claim 28, wherein the light quantity control member consists of an electrooptical element.

30. A digital camera according to claim 29, wherein the light quantity control member is an aperture member that controls an aperture caliber to control the subject light passing through the image taking lens.

31. A digital camera according to claim 29, wherein the light quantity control member is a shutter member that controls a shutter speed to control the subject light passing through the image taking lens.

32. A digital camera according to claim 28, wherein the light quantity control member is an aperture member that controls an aperture caliber to control the subject light passing through the image taking lens.

33. A digital camera according to claim 28, wherein the light quantity control member is a shutter member that controls a shutter speed to control the subject light passing through the image taking lens.

* * * * *